United States Patent
Istvan et al.

(10) Patent No.: US 8,359,351 B2
(45) Date of Patent: Jan. 22, 2013

(54) NETWORK-ACCESSIBLE CONTROL OF ONE OR MORE MEDIA DEVICES

(75) Inventors: Anthony F. Istvan, Snoqualmie, WA (US); Rod G. Fleck, Bellevue, WA (US); Robin Budd, Seattle, WA (US); Korina J. B. Stark, Seattle, WA (US); Marcellino Tanumihardja, Seattle, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 12/873,871

(22) Filed: Sep. 1, 2010

(65) Prior Publication Data

US 2010/0332994 A1 Dec. 30, 2010

Related U.S. Application Data

(62) Division of application No. 11/120,656, filed on May 2, 2005, now Pat. No. 7,792,920.

(60) Provisional application No. 60/567,177, filed on Apr. 30, 2004, provisional application No. 60/667,836, filed on Apr. 1, 2005.

(51) Int. Cl.
*G06F 15/16* (2006.01)
*G06F 3/00* (2006.01)

(52) U.S. Cl. ........ 709/203; 709/208; 709/211; 709/217; 709/218; 709/219; 715/744; 715/761

(58) Field of Classification Search .................. 709/203, 709/208–211, 217–219; 715/744–761
See application file for complete search history.

(56) References Cited

U.S. PATENT DOCUMENTS

| | | | |
|---|---|---|---|
| 5,473,609 A | 12/1995 | Chaney | |
| 5,585,838 A | 12/1996 | Lawler et al. | |
| 5,727,060 A | 3/1998 | Young | |
| 5,850,218 A | 12/1998 | LaJoie et al. | |
| 5,883,677 A | 3/1999 | Hofmann | |
| 6,040,829 A | 3/2000 | Croy et al. | |
| 6,163,345 A | 12/2000 | Noguchi et al. | |
| 6,177,931 B1 | 1/2001 | Alexander et al. | |
| 6,347,400 B1 | 2/2002 | Ohkura et al. | |
| 6,363,434 B1 | 3/2002 | Eytchison | |
| 6,466,971 B1 | 10/2002 | Humpleman et al. | |

(Continued)

OTHER PUBLICATIONS

"About HAVi—HAVi Essentials—Fast Track," HAVi, http://www.havi.org/about/aboutoverview.asp 2 pages [Internet accessed on Mar. 18, 2005].

(Continued)

*Primary Examiner* — Djenane Bayard
(74) *Attorney, Agent, or Firm* — Perkins Coie LLP

(57) ABSTRACT

A content management (CM) system is provided to centrally control operation of one or more connected devices by issuing control requests and/or data requests. In some situations the connected device(s) include devices that control presentation of television programming-related content, such as digital video recorder ("DVR") devices and media center devices, and in other situations may include other types of media devices and/or other electromechanical ("E/M") devices that may be centrally controlled, such as E/M devices for home automation that may operate independently or in conjunction with the media devices. In some situations, the CM system communicates with the connected devices via a network and using appropriate protocol(s), and may be accessed remotely via a network so as to allow a user to remotely operate the CM system. The CM system may further control searching, identification, selection, and presentation of pieces of media content by the connected device(s).

16 Claims, 7 Drawing Sheets

U.S. PATENT DOCUMENTS

| | | | |
|---|---|---|---|
| 6,507,950 | B1 | 1/2003 | Tsukidate et al. |
| 6,526,577 | B1 | 2/2003 | Knudson et al. |
| 6,536,041 | B1 | 3/2003 | Knudson et al. |
| 6,564,378 | B1 | 5/2003 | Satterfield et al. |
| 6,601,238 | B2 | 7/2003 | Morrison et al. |
| 6,784,805 | B2 | 8/2004 | Harris et al. |
| 6,792,323 | B2 * | 9/2004 | Krzyzanowski et al. ........ 700/90 |
| 6,857,128 | B1 | 2/2005 | Borden, IV et al. |
| 6,868,292 | B2 | 3/2005 | Ficco et al. |
| 6,871,236 | B2 | 3/2005 | Fishman et al. |
| 6,938,101 | B2 | 8/2005 | Hayes et al. |
| 6,981,273 | B1 | 12/2005 | Domegan et al. |
| 7,047,547 | B2 | 5/2006 | Alten et al. |
| 7,065,777 | B2 | 6/2006 | Inoue |
| 7,130,616 | B2 | 10/2006 | Janik |
| 7,197,759 | B2 | 3/2007 | Barrett et al. |
| 7,373,379 | B2 | 5/2008 | Comstock et al. |
| 7,382,786 | B2 | 6/2008 | Chen et al. |
| 7,418,472 | B2 | 8/2008 | Shoemaker et al. |
| 7,586,398 | B2 | 9/2009 | Huang et al. |
| 7,792,920 | B2 | 9/2010 | Istvan et al. |
| 2001/0011373 | A1 | 8/2001 | Inoue |
| 2001/0042107 | A1 | 11/2001 | Palm |
| 2002/0078161 | A1 | 6/2002 | Cheng |
| 2002/0168177 | A1 | 11/2002 | Kajitani |
| 2002/0174430 | A1 | 11/2002 | Ellis et al. |
| 2002/0178279 | A1 | 11/2002 | Janik et al. |
| 2003/0023975 | A1 | 1/2003 | Schrader et al. |
| 2003/0051246 | A1 | 3/2003 | Wilder et al. |
| 2003/0084449 | A1 | 5/2003 | Chane et al. |
| 2003/0086023 | A1 | 5/2003 | Chung et al. |
| 2004/0031058 | A1 | 2/2004 | Reisman |
| 2004/0068739 | A1 | 4/2004 | Russ et al. |
| 2004/0078815 | A1 | 4/2004 | Lemmons et al. |
| 2004/0268407 | A1 | 12/2004 | Sparrell et al. |
| 2005/0108751 | A1 * | 5/2005 | Dacosta ........................... 725/39 |
| 2005/0182828 | A1 * | 8/2005 | Lamkin et al. ................. 709/219 |
| 2005/0188078 | A1 | 8/2005 | Kotzin et al. |
| 2005/0235047 | A1 | 10/2005 | Li et al. |
| 2005/0278741 | A1 | 12/2005 | Robarts et al. |
| 2006/0020962 | A1 | 1/2006 | Stark et al. |
| 2006/0026636 | A1 | 2/2006 | Stark et al. |
| 2006/0031880 | A1 | 2/2006 | Stark et al. |
| 2006/0064720 | A1 | 3/2006 | Istvan et al. |
| 2006/0080408 | A1 | 4/2006 | Istvan et al. |
| 2006/0085825 | A1 | 4/2006 | Istvan et al. |
| 2010/0031193 | A1 | 2/2010 | Stark et al. |

OTHER PUBLICATIONS

"CDJ Compatibility," Nirvis, Inc., 2001, http://www.nirvis.com/cdj_compat.htm, 4 pages, [Internet accessed on Jul. 10, 2008].

"CDJ Features," Nirvis, Inc., 2001, http://www.nirvis.com/cdj_features.htm, 2 pages, [Internet accessed on Jul. 10, 2008].

"DigiGuide User Manual," DigiGuide Interactive TV & Radio, Apr. 28, 2005, http://www.digiguide.com/support/digiGuideUserManual.pdf, pp. 1-35 [Internet accessed on Oct. 11, 2005].

"Gemstar Wars: Murdoch Strikes Back," Business Week Online, Jun. 3, 2002, http;//www.businessweek.com/print/magazine/content/02_22/b3785064.htm?chan=mz, 2 pages [Internet accessed on Oct. 11, 2005].

"General JXTA™ FAQ," http://www.jxta.org/JXTAFAQ.html, 12 pages [Internet accessed on Nov. 8, 2004].

"GigaSpaces Platform—White Paper," GigaSpace Technologies, Ltd., Feb. 25, 2002, http://webarchive.org/web/20030607073327/j-spaces.com/dowload/GigaSpacesWhitePaper.pdf, 14 pages [Internet accessed on Nov. 8, 2004].

"Jini Network Technology—An Executive Overview," Sun Microsystems, Inc., Palo Alto, CA, Feb. 2001, 19 pages.

"JXTA Technolgy: Creating Connected Communities," Sun Microsystems, Inc., Palo Alto, CA, Jan. 2004, http://www.jxta.org/project/www/docs/JXTA-Exec-Brief.pdf, 6 pages [Internet accessed on Nov. 8, 2004].

"Microsoft Office Outlook 2003, Product Guide," Microsoft corporation, 2004, http://download.microsoft.com/download/2/d/9/2d9e7b12-f966-422c-82c4-679ba323d1ab/Outlook2003 ProductGuide.doc, pp. 1-73 [Internet accessed on Oct. 11, 2005].

"Project Standard Guide," Microsoft Corporation, 2003, http://download.microsoft.com/download/2/9/d/29d9b1f1-f875-430e-8138-8d0a23dbd1c4/ProjectStdGuide.doc, 28 pages [Internet accessed on Oct. 11, 2005].

ReplayTV 5500 Demo,; http://www.digitalnetworksna.Demo, 1 page [Internet accessed on Oct. 11, 2005].

"ReplayTV 5500 Features," http://www.digitalnetworksna.com/dvr/5500/features.asp, 2 pages [Internet accessed on Oct. 11, 2005].

"Slink-e Schematic," Datasheet, Nirvis, Inc., 2001, http://www.nirvis.com/schemati2_0.htm, 2 pages [Internet accessed on Jul. 10, 2008].

"Slink-e Specs," Device features, Nirvis, Inc., 2001, http://www.nirvis.com/slinke_specs.htm, 2 pages [Internet accessed on Jul. 10, 2008].

"Slink-e," Product Controling Panels, Nirvis, Inc., 2001, http://www.nirvis.com/slink-e.htm, 1 pages [Internet accessed on Jul. 9, 2008].

"Technical JXTA™ FAQ," http://www.jxta.org/JXTAFAQTech.html, 10 pages [Internet accessed on Nov. 8, 2004].

"The Connected Home Powered by Java Embedded Server TM Software—White Paper," Sun Microsystems, Inc., Palo Alto, CA, Dec. 2000, 28 pages.

"TiVo Advantage," TiVo.com, http://www.tivo.com/1.0.asp, 2 pages [Internet accessed on Oct. 11, 2005].

"TiVo Desktop," TiVo.com, http://www.tivo.com/4.9.6.1.asp, 2 pages [Internet accessed on Oct. 11, 2005].

"TiVo Online Scheduling," TiVo.com, http://www.tivo.com/4.9.6.asp, 2 pages [Internet accessed on Oct. 11, 2005].

"TiVo Service," TiVo.com, http://www.tivo.com/1.2.asp, 3 pages [Internet accessed on Oct. 11, 2005].

"Understanding Universal Plug and Play," Microsoft Windows, Me—Millennium Edition, White Paper, Jun. 2000, 45 pages.

"What We Do—TV Guide on Screen," Gemstar—TV Guide International, http;//www.gemstartvguide.com/whatwedo/tvgonscreen.asp, 2 pages [Internet accessed on Oct. 11, 2005].

"Windows Media—Windows Media Player," Microsoft Corporation, 2004, http://download.microsoft.com/download/0/b/8/0b89049d-dc57-4571-aa69-cf592743a241/WMPlayer.doc, 211 pages [Internet accessed on Apr. 4, 2006].

Block, R. "Toss that remote, score one for cellphones," Jun. 30, 2004, http://engadget.com/entry/5178754663242732/, 3 pages [Internet accessed on Jan. 20, 2005].

CDJ Screenshot, CDJ GUI Interface, Nirvis, Inc., 2001, http://www.nirvis.com/Images/ir/screenshot.gif, 1page [Internet accessed on Jul. 10, 2008].

Chen, K. et al., "Programming Open Service Gateways with Java Embedded Server Technology," Chapter 1, Addison Wesley Professional, ed. 1, Aug. 30, 2001, http://awprofessional.com/title/0201711028, cover page & pp. 1-14 [Internet accessed on Jan. 26, 2005].

Dudley, B, "Consumer Electronics Show: Buzz is on Home-Media centers," Readen Studios, Jan. 6, 2002, http://www.rearden.com/articles/seattletimesjan0602.html, 3 pages [Internet accessed on Mar. 18, 2005].

Final Office Action for U.S. Appl. No. 11/120,656, Mail Date Apr. 30, 2009, 19 pages.

Final Office Action for U.S. Appl. No. 11/397,531, Mail Date Mar. 13, 2009, 36 pages.

International Search Report and Written Opinion for International Application No. PCT/US05/15247, Mail Date Jun. 11, 2008, 9 pages.

Joyce, E., "Gemstar Patent Woes Signal shift in iTV Tech," Jun. 25, 2002, http://www.atnewyork.com/news/print.php/1371211, 3 pages [Internet accessed on Oct. 11, 2005].

McLean, S. et al., "Understanding the .NET Remoting Architecture," Microsoft .NET Remoting, Chapter 2, http://proquest.safaribooksonline.com/print?xmlid=0735617783/ida5rzr, 5 pages [accessed on Sep. 24, 2008].

Non-Final Office Action for U.S. Appl. No. 11/120,664, Mail Date Apr. 16, 2009, 36 pages.

Phillips, W., "The Nirvis Slink-e and CDJ Software," Product Review, Jun. 15, 2001, http://www.onhifi.com/product/nirvis_slinke.htm, 4 pages [Internet accessed on Jul. 9, 2008].

Replaytv, "Internet Scheduling," <http://www.digitalnetworksna.com/demo/index_f.html>, internet accessed on Jan. 20, 2005, 1 page.

Tindall, P. "Taking the Enterprise Application to the Net," Developing Enterprise Applications—An Imputrist's View, Chapter 12, http://proquest.safaribooksonline.com/print?xmlid=0789722690/ch12Ievlsec1, 8 pages [accessed on Sep. 24, 2008].

Yomogita, H., "PnP Middleware Connects Home Appliances for Networking," Nikkei Electronics—Asia, Special Report, Aug. 1999, http://nikkeibq.com/nea/aug99/specrep, 7 pages [Internet accessed on Jan. 26, 2005].

Zap2it, TV Listings Pritable Grid, http://tvlistings.zap2it.com/grid_printable.asp, 1 page [Internet accessed on Mar. 18, 2005].

* cited by examiner

NETWORK-ACCESSIBLE CONTROL OF ONE OR MORE MEDIA DEVICES

CROSS REFERENCE TO RELATED APPLICATIONS

The present application is a divisional of U.S. patent application Ser. No. 11/120,656 filed May 2, 2005, now U.S. Pat. No. 7,792,920 entitled "Network-Accessible Control of One or More Media Devices," which claims the benefit under 35 U.S.C. §119(e) of U.S. Provisional Patent application Ser. No. 60/567,177, entitled "Browser For Multimedia Content" and filed Apr. 30, 2004, and of U.S. Provisional Patent Application Ser. No. 60/667,836, entitled "Interface For Manipulating Multimedia Content" and filed Apr. 1, 2005, each of which is incorporated herein by reference in its entirety.

The present application is also related to each of U.S. patent application Ser. No. 11/120,635 filed May 2, 2005, entitled "Controlling One Or More Media Devices;" U.S. patent application Ser. No. 11/120,654 filed May 2, 2005, entitled "Controlling Content Presentation;" and U.S. patent application Ser. No. 11/120,653 filed May 2, 2005, entitled "Smart Home Control Of Electronic Devices," each of which is filed concurrently and is hereby incorporated by reference in its entirety.

TECHNICAL FIELD

The present disclosure generally relates to techniques for controlling media devices and/or other types of electronic devices.

BACKGROUND INFORMATION

Consumers in today's society are provided with many different types of multimedia content. Indeed, it is often possible for any particular piece of information to be represented in the form of audio, television, text, video, still image, Internet Web page, or other multimedia format. Given the large amount of information available to consumers and given the many different multimedia formats available, it is beneficial to assist consumers in identifying, obtaining, and presenting pieces of multimedia content that may be of interest.

In the current world of television, movies, and related media systems, many consumers receive television programming-related content via broadcast over a cable network to a television or similar display, with the content often received via a set-top box ("STB") from the cable network that controls display of particular television (or "TV") programs from among a large number of available television channels, while other consumers may similarly receive television programming-related content in other manners (e.g., via satellite transmissions, broadcasts over airwaves, over packet-switched networks, etc.). In addition, enhanced television programming services and capabilities are increasingly being provided to consumers, such as the ability to receive television programming-related content that is delivered "on demand" using Video on Demand ("VOD") technologies (e.g., based on a pay-per-view business model) and/or various interactive TV capabilities. Consumers generally subscribe to services offered by a cable network "head-end" or other similar content distribution facility to obtain particular content, which in some situations may include interactive content and Internet content.

Consumers of content are also increasingly using a variety of devices to record and control viewing of content, such as via digital video recorders ("DVRs") that can record television-related content for later playback and/or can temporarily store recent and current content to allow functionality such as pausing or rewinding live television. A DVR may also be known as a personal video recorder ("PVR"), hard disk recorder ("HDR"), personal video station ("PVS"), or a personal television receiver ("PTR"). DVRs may in some situations be integrated into a set-top box, such as with Digeo's MOXI™ device, while in other situations may be a separate component connected to an STB and/or television. In addition, electronic programming guides ("EPGs") are often made available to aid consumers in selecting a desired program to currently view and/or to schedule for delayed viewing. Using an EPG and a DVR, a consumer can cause a desired program to be recorded and can then view the program at a more convenient time or location.

As another example, the Internet has become a frequently used source of multimedia content. Consumers may obtain music downloads, pictures, audio or video clips, graphical or textual information, or other multimedia content by accessing suitable Web sites and downloading the desired piece(s) of multimedia content from the accessed Web site(s).

However, as the multimedia industry grows and as additional types of content are increasingly being stored and made available to consumers, it is becoming increasingly difficult for consumers to effectively manage the content and the related capabilities of the various devices that are available to present the content or to control the content presentation. Moreover, the increase in number and types of media devices within homes (e.g., televisions, handheld and desktop computing systems, stereos, speakers, cellphones, DVRs, STBs, etc.) makes the task of effectively presenting and otherwise managing the multimedia content even more difficult. For example, it is quite common for each consumer's household to possess several remote controls, with each remote control being operative to control only its corresponding media device. Thus, consumers are forced to familiarize themselves with the features of each individual remote control, which can become difficult or frustrating to a consumer as additional media devices (and their remote controls) are added to a household or whenever such media devices are modified or upgraded to other models and versions. Moreover, in some situations, various electronic devices in the household may not have associated remote controls or may otherwise require the consumer to actively operate their controls, which similarly can lead to difficulties and frustrations for the user.

BRIEF DESCRIPTION OF THE DRAWINGS

Non-limiting and non-exhaustive embodiments are described with reference to the figures, wherein like reference numerals refer to like parts throughout the various views unless otherwise specified.

DETAILED DESCRIPTION

Figure 1:
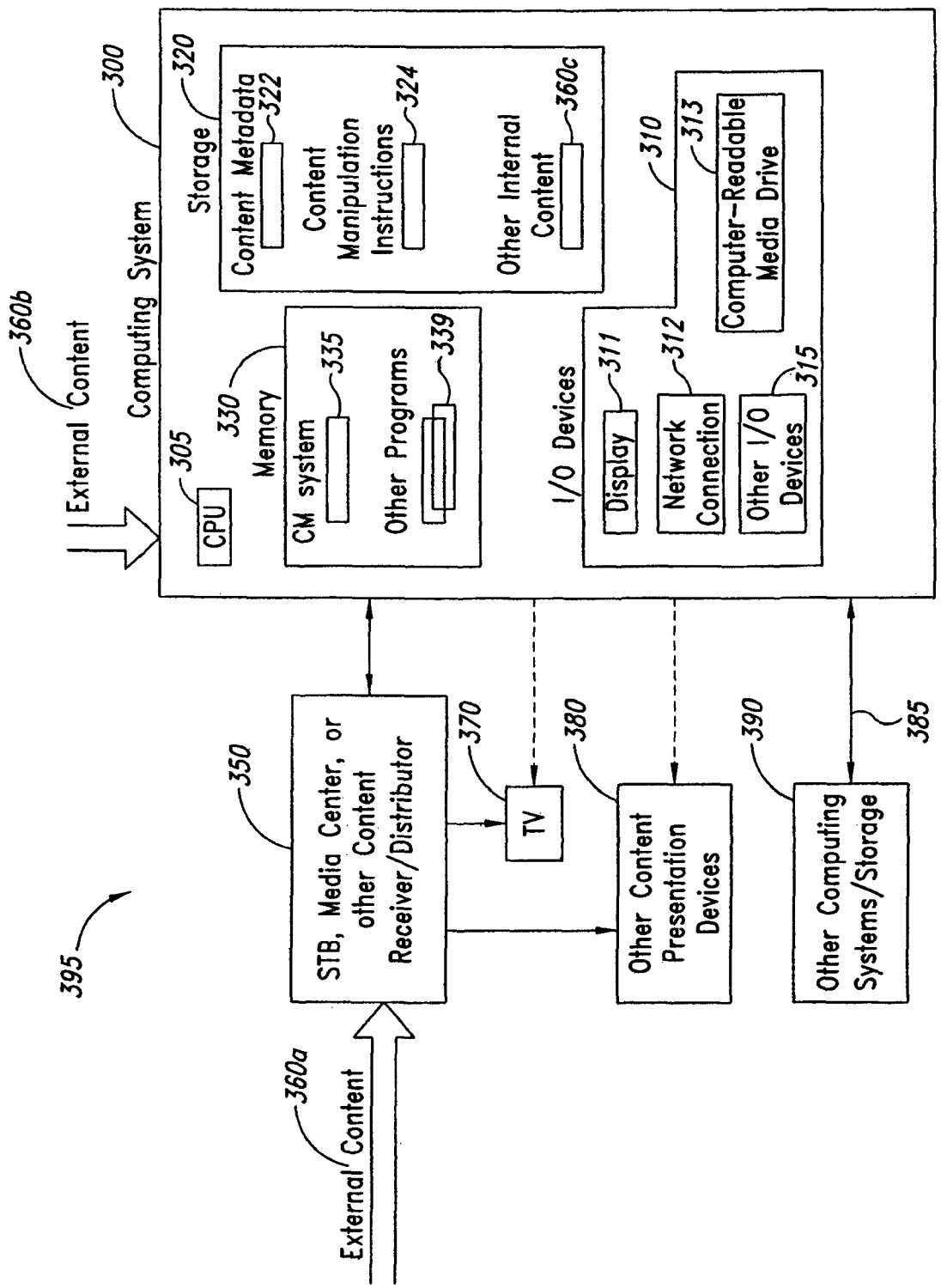
FIG. 1 is a block diagram of an embodiment of a content management ("CM") system environment in which an embodiment of a content management system interacts with one or more other devices in the environment.

Techniques are described below for managing various types of devices in various ways, such as via a graphical user interface ("GUI") of a Content Management ("CM") system executing on a computing device. In at least some embodiments, the CM system on the computing device interacts with various other content presentation control devices (e.g., STBs, DVRs, media center devices, etc.) and/or other media devices that store, present, control or otherwise manage content, and in some embodiments may interact with a variety of other types of electronic devices (whether instead of or in addition to content presentation control devices and other media devices). In at least some such embodiments, the CM system acts as a "control point" for such other devices, such as by passing control requests to those devices (e.g., in response to user selections or other actions via the GM system GUI) and/or by retrieving data from those devices (e.g., for display in the CM system GUI to one or more users). Moreover, in at least some embodiments the underlying control logic (including business rules) for the other devices, information about current state of the other devices and/or content used by the other devices are maintained at the other devices, and if so may or may not be available to the CM system or the computing device.

In at least some embodiments, at least some content being managed by the CM system via the other devices includes television programming-related content, such as with the CM system receiving and using EPG metadata information for the content (e.g., via interactions with an STB), while in other embodiments a variety of other types of content may be managed via the other devices. Moreover, control requests may take a variety of forms in various embodiments, and may vary based on a type of device being managed and/or a type of content associated with the device, with example control requests including requests to record a television program, to playback recorded content, to request EPG metadata information so that the CM system can present the EPG information in the GUI or otherwise use the information, to tune a media device to a particular channel, and so forth. In addition, the CM system may further perform various other types of device interaction and content management functions, as described in greater detail below.

In some embodiments, the CM system may control or otherwise communicate with one or more media devices using different communication protocols and/or interfaces. Non-limiting examples of such communication protocols include Universal Plug And Play ("UPnP"), hypertext transfer protocol ("HTTP"), or other suitable protocol(s).

In some embodiments, the CM system may be used to control the presentation of content by the media devices. For example, the CM system may instruct (or otherwise control) a media device to search for and/or access one or more content repositories for desired content or to otherwise retrieve content from one or more content sources, such as from a media server device via a local area network shared by the media device and the CM system's computing device. After the desired content is located from a suitable content repository, the CM system may control the manner in which the media device(s) accesses and presents the content, such as via one or more other presentation devices (e.g., speakers, a stereo, a television display, a computing system display, etc.).

In some embodiments, the CM system may also be remotely used or otherwise remotely accessed by a user in various ways. Thus, whether alternatively or additionally to physically using the CM system at the computing device, the user may remotely access the CM system in such embodiments, such as via a network (e.g., the Internet), thereby giving the user the capability to remotely manage media devices.

In some embodiments, the CM system may also interact with other electronic devices in a household, whether alternatively or additionally to interacting with media devices. For instance, a "smart home" or "smart office" may be provided wherein the CM system controls electromechanical devices that are present, such as a heating, ventilation and air conditioning ("HVAC") system, lighting, household appliances, or other types of devices. Thus, for example, if the user wishes to watch a recorded television program, the CM system may be used to activate playback of the recorded television program by a DVR, while the CM system is also used to control the lighting, temperature, drapes, etc. in the household so as to give the user an optimum environment for viewing the television program, such as in a coordinated manner (e.g., based on a single instruction from the user, such as from a previously defined association and/or previously defined preferences).

In some embodiments, the CM system may also provide a variety of other types of capabilities via a GUI to allow one or more users to manage, directly or through other devices, various types of multimedia content (such as television programming, photographs, music, video clips, audio clips, video games, etc.). Example embodiments of a CM system GUI and associated content management capabilities are described in further detail in U.S. patent application Ser. No. 11/121,313 entitled "Time-Based Graphical User Interface For Television Program Information," and in U.S. patent application Ser. No. 11/120,664 entitled "Maintaining A Graphical User Interface State That Is Based On A Selected Piece Of Content," both filed on May 2, 2005, and assigned to the same assignee as the present application, and which are each hereby incorporated by reference in their entirety.

For illustrative purposes, some embodiments are described below in which specific types of content are managed or otherwise controlled, such as directly by the CM system or indirectly through one or more electronic devices, and in specific ways via specific example embodiments of the CM system. However, the techniques can be used in a wide variety of other situations, and the specific illustrative details discussed herein are not limiting. More generally, as used herein, multimedia "content" generally includes television programs, movies and other video information (whether stored, such as in a file, or streamed), photos and other images, music and other audio information (whether stored or streamed), presentations, video/teleconferences, videogames, Internet Web pages and other data, and other similar video or audio content.

Referring first to FIG. 1, a network diagram illustrates an example use of an embodiment of the CM system in a home environment 395 for entertainment purposes, although the CM system could similarly be used in business or other non-home environments and for purposes other than entertainment. In this example, the home environment includes an STB or other media center 350 receiving external content 360a that is available to one or more consumers (not shown) in the home environment 395, such as television programming-related content 360a or other multimedia content for presentation on a television 370. Hereinafter, the media center 350 will be identified for illustrative purposes as one example type of media device that can be controlled by or that can interact with the CM system, although other types of media devices and/or electronic devices may also be shown and described in specific examples.

Other types of audio and/or video content could similarly be received by and/or stored by the media center 350 and presented to the consumer(s) on the television and/or optional other content presentation devices 380 (e.g., other televisions, a stereo receiver, stand-alone speakers, the displays of various types of computing systems, wireless devices, a digital picture frame, etc.) in the home environment 395.

The home environment 395 also includes an example computing system 300 suitable for executing an embodiment of the CM system, as well as one or more optional other local computing systems and/or storage devices 390 with which the computing system 300 can interact via local network 385 (e.g., a wireless or wired/cabled LAN). In the illustrated embodiment, the computing system includes a CPU 305 or other processor(s), various I/O devices 310, storage 320, and memory 330, and the illustrated I/O devices include a display 311, a network connection 312, a computer-readable media drive 313, and other I/O devices 315 (e.g., a keyboard, a mouse, a pointing device, speakers, etc.). In some embodiments the computing system 300 may further interact with one or more external computing systems, not shown (e.g., via the World Wide Web or otherwise via the Internet), such as to receive additional external content 360b and/or other information or services. In addition, in an embodiment that will be described below, the CM system can be accessed or otherwise operated remotely by a user via the Internet or other network.

In the illustrated embodiment, the computing system 300 interacts with the media center 350 in a variety of ways (e.g., via a direct connection, as part of local network 385, or as part of another network, not shown), including to receive information about current and/or future television programming-related content and/or other content 360a. In this example, the information received by the computing system 300 includes EPG metadata information for television programming-related content (e.g., from a cable network operator), and can further include a variety of other types of metadata for the content 360a, whether from the cable network operator or other third-parties (e.g., from various external computing systems, not shown, such as via external content 360b). This received content metadata is then stored in a content metadata database 322 (or other suitable data structure) in the illustrated embodiment for use by the CM system.

An embodiment of the CM system 335 is executing in memory 330, and in at least some embodiments comprises software or other machine-readable instructions that can be executed by the CPU 305 or other processor. One example of the CM system 335 would be a service application that runs in the background (e.g., to programmatically receive and handle requests), while in another example would be an application program that runs in the foreground and controls an appropriate display device (e.g., to present a GUI of the CM system. The CM system may provide information about the available content to one or more users, such as via a GUI that is displayed on the display device 311 and/or on one or more of the content presentation devices 370 or 380 or other computing systems 390 (e.g., to one or more users in the home environment), and/or via information transmitted to remote users (not shown). For example, the CM system may provide some or all of the stored content metadata 322 to the users, and also allow the users to manipulate the content in a variety of ways (e.g., to select content for current presentation, for future recording, etc.), as well as in some embodiments maintaining a state of the GUI as displayed information changes.

As the user provides instructions related to manipulation of the content, those content manipulation instructions are in the illustrated embodiment stored in a database 324 (or other suitable data structure) on storage 320 for later retrieval and use by the CM system, and at least some such content manipulation instructions may additionally in some embodiments be provided to the media center 350 for use in actually performing the tasks to satisfy the manipulation instructions. In addition, in some embodiments the CM system may also interact with other executing programs in order to provide additional information and/or functionality to the user(s), such as one or more optional executing other programs 339 in memory 330 or instead remote executing programs (not shown) on another computing system.

In the illustrated embodiment, the CM system does not itself present the external content 360a to the user(s), instead interacting with the media center 350 to control the display of the content to the user via the TV 370 and/or one or more of the other content presentation devices 380. However, in other embodiments the CM system may instead receive some or all of the external content 360a, whether via the media center 350 or instead directly from the source of that content, and if so could directly control the presentation of that content to the user(s) on the display device 311 and/or other content presentation device 370 or 380 or other computing system 390. Conversely, in the illustrated embodiment the computing system 300 and/or media center 350 may have access to additional content, such as external content 360b (e.g., from remote computing systems over the Internet), locally stored other content 360c on storage 320, and/or other locally accessible content (not shown), such as from one or more of the other computing systems/storage devices 390—if so, the computing system 300 may in some embodiments directly present some or all of that content to the user(s), such as on display device 311 (e.g., as part of the CM system GUI) and/or on one or more other content presentation devices 370 or 380 or other computing system 390, while in other embodiments may present some or all of that content to the user(s) by instead interacting with the media center 350 to facilitate the presentation (e.g., by providing the additional content to be presented and/or associated instructions to the media center). As previously noted, the additional content may be content related to the external content 360a but from another source (e.g., additional television-related programming, such as streamed or downloaded over a computer network) and/or multimedia content of other types (e.g., movies and other video information, photos and other images, music and other audio information, presentations, video/teleconferences, videogames, Internet Web pages and other data, etc.).

The functionality of the CM system may be accessed in various ways in different embodiments. For example, some users may have physical access to the computing system 300, and if so may interact with the various I/O devices 310 to provide and/or receive information. Alternatively or additionally, other users may use other client computing devices to remotely access the CM system, such as other local computing systems 390 or instead remotely (e.g., via the World Wide Web or otherwise via the Internet, such as by using Web services or other remote access capabilities provided by the CM system). Such remote users may use software or other functionality provided on the client computing systems (not shown), such as a browser, to interact with the CM system. In other embodiments, users may receive functionality and/or information from the CM system indirectly via interactions with one or more other devices, such as the media center 350, which may directly receive that functionality or information from the CM system before providing it to the users.

For example, in some embodiments the computing system 300 and/or one of more of the computing systems 390 is a cellphone (e.g., a smartphone) or other mobile or handheld device with communications capabilities (e.g., a Pocket PC computer, a PDA, an electronic organizer, etc.), and if so the user may use that device to manage content in various ways. In such embodiments, the communications between the cellphone or other device and other computing systems and devices in the example home environment may occur in various manners. For example, some devices may support various types of local communication mechanisms (e.g., wireless communications via Bluetooth, Wi-Fi, direct infrared, etc.) and/or communication mechanisms that may be used remotely (e.g., if the device supports Internet access, such as via GPRS and using HTTP or WAP, via Web services over HTTP, or instead using a standard telecommunications link for exchanging voice and other audio information), and may further support various communication and messaging protocols (e.g., UPnP, Home Audio Video Interoperability (or "HAVI"), etc.). When a device supports both local and remote communication mechanisms, the device may further be configured to seamlessly switch between local and remote communications as appropriate, such as to automatically use local communications when they are available and to use remote communications otherwise, or instead may use various communications as directed by the user. Remote communications may be appropriate, for example, when the device is remote from the home environment (e.g., outside a building that contains the home environment, not shown, such as at significant distances), such as to perform some or all data exchange via Internet access and/or using voice commands over a standard telecommunication link. In addition, various types of devices may have varying communications abilities, and thus devices in various embodiments may use different forms of communication for a single type of information exchange.

When a user uses a cellphone or other mobile or handheld device to manage content, various types of information may be exchanged in various ways. For example, software to implement at least a portion of the CM system on the device and/or to interact with a remote executing CM system may be preinstalled on the device when provided to the user (e.g., by the distributor of the device) and/or may be downloaded to the device after the user has the device (e.g., as an executable file from another local computing system to which the device has a physical or wireless connection, or directly from a remote Web site if the device supports Internet access). EPG and/or other types of metadata may similarly be provided to the device in various ways, such as via Internet access to a local computing system (e.g., computing system 300) and/or a remote computing system, or instead from a local computing system and/or media center device 350 via local communication mechanisms. Commands and other information from the user may similarly be provided from the device to computing systems and other devices in the home environment in various ways, including via Internet access and/or local communication mechanisms.

Computing system 300 is merely illustrative and is not intended to limit the scope of the present invention. For example, the computing system may instead be comprised of multiple interacting computing systems or devices, and may be connected to other devices that are not illustrated, including through one or more networks such as via the World Wide Web ("Web") or otherwise via the Internet. More generally, the computing system 300 and/or the other computing systems 390 may each comprise any combination of hardware or software that can perform the described techniques, including (without limitation) desktop or other computers, network devices, Internet appliances, PDAs, cordless and other wireless phones, cellphones, devices with walkie-talkie and other push-to-talk capabilities, personal/digital video recorders, pagers, electronic organizers, television-based systems and various other consumer products that include appropriate inter-communication and computing capabilities. In addition, the functionality provided by the CM system may in some embodiments be distributed in additional systems, and the CM system may have multiple components that each provides a portion of the functionality of that system. Similarly, in some embodiments the functionality of some of the illustrated systems may not be provided and/or other additional functionality may be available.

While various items are illustrated as being stored in memory or on storage while being used, these items or portions of them can be transferred between memory and other storage devices, such as for purposes of memory management and data integrity. Alternatively or additionally, in other embodiments some or all of the software system (or portions of it) may execute in memory on another device and communicate with the illustrated computing system via inter-computer communication. Some or all of the system and/or data structures (e.g., portions of a database, such as one or more tables or views or portions thereof) used by the system may also be stored (e.g., as software instructions or structured data) on a computer-readable medium, such as a hard disk, a memory, a computer network or other transmission medium, or a portable media article (e.g., a CD, DVD or flash memory device) to be read by an appropriate drive or via an appropriate connection. Some or all of the system and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, one or more embodiments may be practiced with other computer system configurations.

Figure 2:
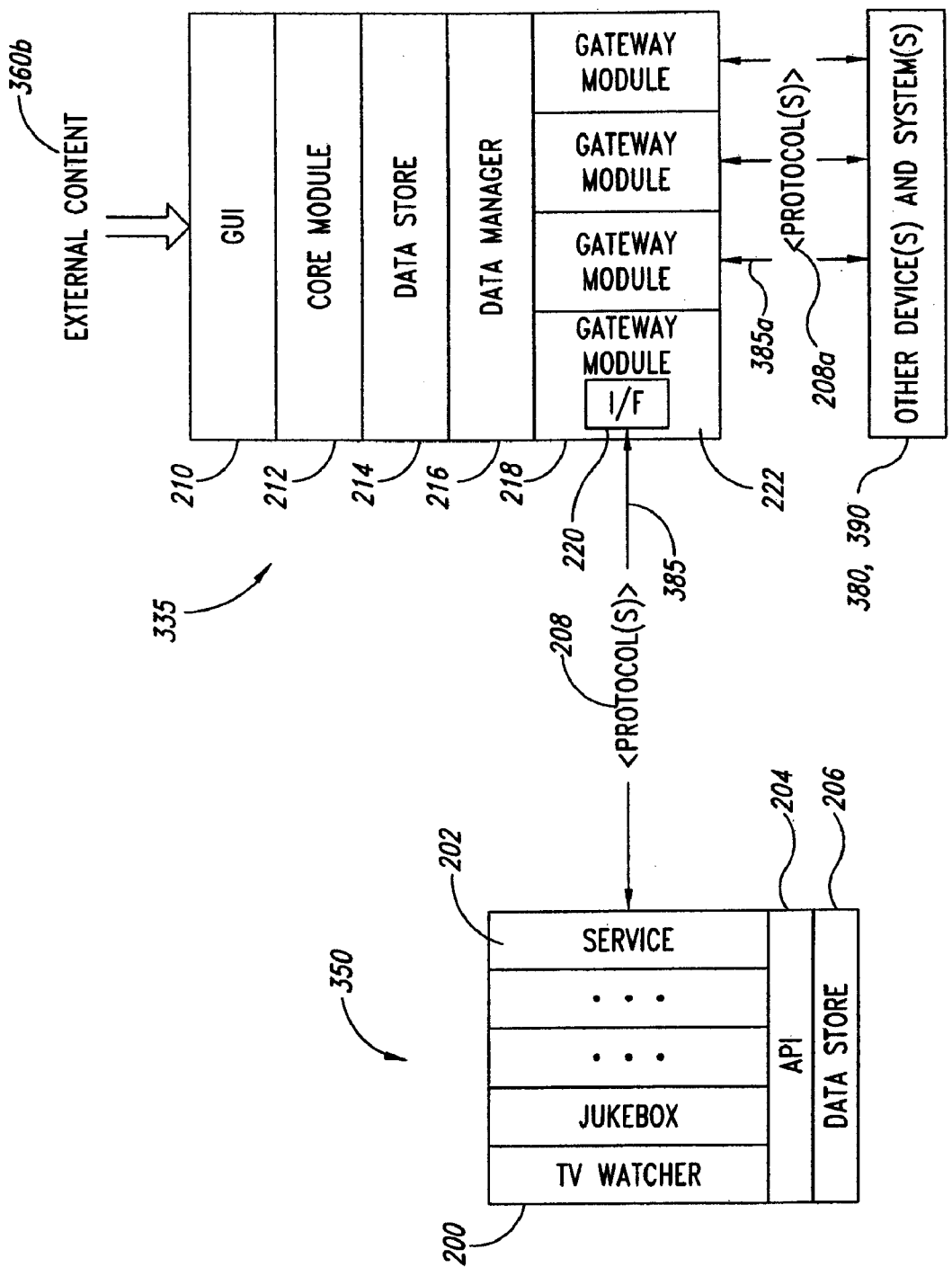
FIG. 2 is a block diagram of an embodiment of the CM system and one of the other devices in the environment shown in greater detail.

FIG. 2 shows an embodiment of the CM system 335 and media center 350 in more detail, including illustrating interactions between the two. For the purposes of brevity and simplicity of explanation, only certain elements of the CM system 335 and/or the media center 350 are shown and described herein.

In various embodiments, the media center 350 may comprise a DVR, STB, PVR, or other media device. The media center 350 may also be a "standalone" device, such as a Replay TV or TiVo device (as illustrative examples), or may be an integrated device that includes multiple types of capabilities, such as Digeo's MOXI™ device or devices provided by many multiple service operators ("MSOs"), as illustrative examples. The media center 350 may include one or more processors (not shown) and a data store 206. The data store 206 may store a variety of different types of data, including but not limited to, external content 360a, information received from the CM system 335 (including command and request information), state information, processing information, or other type of computer-readable information.

In the illustrated embodiment, the media center 350 includes one or more services 200, including a TV watching service and jukebox service in the example of FIG. 2, that provide various functionalities and capabilities of the media center 350. These services 200 may also include a communication service 202, such as a UPnP service and/or a HTTP service in an example embodiment, which is used for communication with the CM system 335 and optionally other devices. For example, in some embodiments the communication service 202 may be implemented as a UPnP daemon that runs in the background.

In the illustrated embodiment, the media center 350 exposes access to its services 200 via one or more application program interfaces ("APIs") 204—by exposing its services via the API 204, external systems (such as the CM system 335) may communicate with the API 204 (e.g., via API function calls) to access, use, or otherwise interact with the functionality provided by the services 200. Alternatively or additionally, the CM system 335 may communicate directly with any of the services 200 without communicating via the API 204, such as by transmitting control instructions in a manner similar to a remote control device (not shown) for the media center 350. In some embodiments, the CM system 335 communicates with the media center 350 via the API 204 using one or more suitable protocols 208. Non-limiting examples of a protocol 208 include UPnP, HTTP, a custom protocol, or any other protocol that is suitable to allow two or more devices to communicate with one another, including higher-level protocols based on other communication protocols (e.g., by using Web service calls over HTTP). For the sake of completeness, a general description of the UPnP protocol is provided next.

By way of general discussion, the UPnP architecture allows devices to connect seamlessly and to simplify the implementation of networks in home and corporate environments. The UPnP architecture offers pervasive peer-to-peer network connectivity of PCs of all form factors, intelligent appliances, and/or wireless devices. The UPnP architecture is a distributed, open networking architecture that leverages TCP/IP and the World Wide Web to enable seamless proximity networking in addition to control and data transfer among networked devices in the home, office, and everywhere in between.

The UPnP architecture enables data communication between any two devices under the command of a suitable control device on the network. The UPnP architecture supports zero-configuration, networking, and automatic discovery for a breadth of device categories from a wide range of vendors, whereby a device may dynamically join a network, obtain an IP address, announce its name, convey its capabilities upon request, and learn about the presence and capabilities of other devices. UPnP networking involves the following steps:

1. Discovery: Given an IP address, the first step in UPnP networking is discovery. When a device (e.g., the media center 350, other content presentation devices 380, other computing systems 390, and so forth) is added to the network, the UPnP discovery protocol allows that device to advertise its services to control points on the network (e.g., the media center 350 and/or the CM system 335 of the computing system 300).

2. Description: The next step in UPnP networking is description. After a control point has discovered a device, the control point may know very little about the device. For the control point to learn more about the device and its capabilities, or to interact with the device, the control point retrieves the device's description from a uniform resource locator ("URL"), for example, provided by the device in the discovery message. The UPnP description for a device may be expressed in XML and may include, for instance, manufacturer information like the model name and number, serial number, manufacturer name, URLs to vendor-specific web sites, etc. The description may also include a list of any embedded devices or services (e.g., the services 200), as well as URLs for control, eventing, and presentation. For each service, the description may include a list of the commands or actions that the service responds to, and parameters or arguments for each action; the description for a service 200 may also include a list of variables, which may model the state of the service at run time, and which may be described in terms of their data type, range, and event characteristics.

3. Control: The next step in UPnP networking is control. After a control point has retrieved a description of the device, the control point may send actions to a device's service. One technique to perform this is for a control point to send a suitable control message to a control URL for the service (provided in the device description). Control messages may also be expressed in XML using the Simple Object Access Protocol ("SOAP") or other suitable format.

4. Event notification: The next step in UPnP networking is event notification, or "eventing". A UPnP description for a service includes a list of actions that the service responds to and a list of variables that model the state of the service at run time. The service publishes updates when these variables change, and a control point may subscribe to receive this information. The service publishes updates by sending event messages. Event messages contain the names of one of more state variables and the current value of those variables.

5. Presentation: The next step in UPnP networking is presentation. If a device has a URL for presentation, then the control point may retrieve a page from this URL, load the page into a Web browser, and depending on the capabilities of the page, allow a user to control the device and/or view device status. The degree to which each of these may be accomplished depends on the specific capabilities of the presentation page and device.

Various additional details related to the UPnP protocol are available in "Understanding Universal Plug and Play: White Paper", available at http://www.upnp.org/download/UPNP_UnderstandingUPNP.doc, which is hereby incorporated herein by reference in its entirety.

While the UPnP protocol is described herein as one of the protocols 208 that may be used on the local network 385 (which communicatively couples the computing system 300 to the media center 350 and/or to other devices in the home environment 395, other types of protocols may be used, such as HTTP, a custom protocol, or any suitable combination of protocols.

In the illustrated embodiment, the CM system 335 includes a GUI 210, a core module 212, a data store 214, a data manager 216, and one or more gateway modules 218. The GUI 210 may present EPG and/or other multimedia metadata information, controls, or other tools and functionality to allow a user to view, arrange, manipulate, or to otherwise manage and control content, media devices (e.g., the media center 350, the other content presentation devices 380, etc.), and/or other electronic devices. An example of the GUI 210 is illustrated as GUI 100 in FIG. 7, and additional examples are disclosed in the other patent applications identified above.

In the illustrated embodiment, the core module 212 serves as the underlying control engine for the CM system, such as to generate or otherwise provide control requests and data requests (e.g., in response to instructions from the GUI, such as based on user selections of controls and other user actions). For example, the core module 212 may generate requests for EPG metadata, recording status information, multimedia content metadata, or other data related to the operation of the media center 350, and then provide the data to the GUI 210. Such data may be stored in a local data store 214 (e.g., at least a portion of the storage 320 of FIG. 1, such as that holds an SQL or other relational database) and/or other data repository or data structure, such as after it is retrieved or otherwise obtained from the media center 350 or other source. In addition, in this illustrated embodiment, a data manager 216 cooperates with the core module 212 to manage the flow of data to, from, and within the CM system 335, such as to provide an interface to the data store (e.g., by acting a database server for a database portion of the data store).

The control requests generated by the core module 212 may be sent to the media center device 350 to control or otherwise manage the device, such as requests to record a certain program at a certain time, to play back a recorded program, to turn ON/OFF, and so forth. The core module 212 may also generate control and data requests directed towards other devices, such as the content presentation devices 380, other computing systems 390, and/or any other device in the home environment 395 that is communicatively coupled to or otherwise associated with the CM system 335. The core module 212 may also control or otherwise manage other operational features of the CM system 335, including communications, data storage/processing/management, and other operations.

In at least some embodiments, the CM system 335 physically or logically communicates with the media center 350 via the local network 385, which may comprise an Ethernet network connection or other type of network (whether wired and/or wireless). In particular, at least some such communications may include the CM system 335 invoking or otherwise accessing the API 204 of the media center 350 in order to control or otherwise manage one or more of the services 200 of the media center 350 that are exposed via the API, such as via the UPnP Service 202 that is made available via a network connection. In at least some embodiments, there may also be one or more other networks 385*a* that the CM system 335 uses to communicate with other devices, such as the devices 380, systems 390, and/or other devices and systems, such as by using one or more communication protocols 208*a*. The networks 385*a* and the protocols 208*a* may be the same or different than the network 385 and the protocol 208, respectively.

In at least some embodiments, the CM system 335 further includes one or more gateway modules 218 to facilitate communication with other device. For example, a different gateway module 218 may be provided for each corresponding type of media center 350 or for other type of external devices/systems in communication with the CM system 335, such as to use APIs provided by that type of device and/or to use one or more communication protocols supported by that type of device. Thus, each gateway module 218 may communicate with one or more corresponding external devices using an appropriate protocol(s) 208 and/or 208*a*, such as by way of an interface 220 of that gateway module. For example, when the protocol 208 in use is UPnP, a gateway module 222 corresponding to the media center 350 may include a UPnP interface 220 such that calls to the media center's API 204 using the UPnP protocol are passed through the UPnP Service. Additional details regarding communicating between the CM system 335 and external devices will be discussed below.

In addition, in some embodiments the CM system 335 has an extensible architecture that allows additional gateway modules to be added as appropriate. Thus, as additional media devices and/or other external devices are added to the home environment 395, one or more corresponding new gateway modules 218 may be installed or modified in the CM system 335. Moreover, certain gateway modules 218 may be deactivated or removed if their corresponding external device(s) is replaced, disconnected, or otherwise discontinued from use. The capability to add, remove, and/or modify the gateway modules 218 provides a convenient and scalable technique to centrally manage or otherwise centrally control a plurality of connected devices, without having to perform substantive modifications to the underlying hardware and/or software of such devices or of the CM system.

As described above, many media centers 350 provide an API 204 that exposes services 200 of the media centers, thereby providing the CM system 335 with a mechanism to use to control or otherwise access these services 200 without having to perform hardware and/or software modifications on the media centers 350. In some types of media centers 350 and/or with other types of media devices, however, certain modifications may be performed in at least some embodiments to improve the interaction between the CM system 335 and the media center 350. For example, to implement a "silent operation" mode when the CM system 335 is being used, the media center 350 of an embodiment may be designed and/or configured to be able to suppress on-screen displays or messages that typically arise in response to direct interactions with the media center—if so, interactions initiated from the CM system 335 may instead cause such displays or messages to be passed to the CM system 335 for display within the GUI 210 or for other handling as appropriate. Similarly, other types of information that may be provided by the media center in situations other than in response to direct interactions (e.g., messages related to conflicts that are detected, such as related to more programs to be simultaneously recorded and/or presented than can be handled by the media center, and to resolution options for the conflicts) may instead be directed to the CM system 335 as part of such a "silent operation" mode, such as for appropriate handling by the CM system 335 (e.g., by providing conflict resolution instructions from the CM system to the media center, such as in response to user instructions via the GUI 210).

As previously discussed, both the CM system 335 and the media center 350 may be nodes on the same network in at least some embodiments, such as in the examples of FIGS. 1-2—such inter-connection allows for device discovery, command control, data retrieval, or other operations pertaining to the communication protocol used and/or pertaining to a specific function being performed. In addition, the CM system 335 may connect to other external devices and/or content sources in various ways, including over the same network. Moreover, the CM system 335 may obtain metadata (e.g., EPG information and/or metadata for other types of multimedia content) and/or other information of interest from connected devices in various ways. For example, in a first scenario ("scenario 1"), the CM system 335 requests the metadata from the media center 350, while in a second scenario ("scenario 2") the CM system 335 requests the metadata from an external source as part of external content 360*b* (although the CM system 335 may still retrieve other types of information (e.g., scheduling data) from the media center 350 in scenario 2). In both scenarios 1 and 2, the protocol for the connection between the CM system 335 and the media center 350 (and/or between the CM system 335 and some other media device) may be UPnP, UPnP and HTTP, only HTTP, some other protocol, a custom protocol, or any suitable combination thereof. Examples of both of the connection scenarios are provided below:

As an example involving connection scenario 1, the CM system 335 uses a suitable protocol (e.g., UPnP, HTTP, etc.) to communicate with the media center 350 for device discovery, command interface, data retrieval, and other operations via the local network 385. The data retrieval may include the EPG metadata information, which may be acquired by the media center 350 in various ways (e.g., from a MSO head-end via a DOCSIS modem). The media center 350 makes the EPG data available to the CM system 335 as part of the data retrieval in the specified protocol.

As an example involving connection scenario 2, the media center 350 does not provide EPG or other multimedia content metadata to the CM system 335, and thus the CM system 335 has a second connection to retrieve the metadata, such as involving a network connection to retrieve the metadata from an external data source (e.g., using XMLTV for EPG metadata). The CM system 335 is also capable of aggregating data from multiple sources, including data provided from media devices, Internet data, and other data from various other data sources.

One example implementation of the media center 350 includes an integrated media device that uses connection scenario 1 and the UPnP protocol. The integrated media device uses a UPnP-based communication service (e.g., the communication service 202 on the media center 350) for communications between the CM system 335 and the API 204 using the UPnP protocol. The specific functions that are exposed through the UPnP communication service may vary from one media device to another based on what is available in the underlying API 204 and on the specific implementation of the UPnP service. In the CM system 335, the UPnP interface 220 of the gateway module 222 translates command and data requests from the core module 212 into the UPnP protocol, and then passes the requests to the UPnP communication service 202 on the media center 350. The UPnP interface 220 also passes data received from the media center 350 via the UPnP service 202 to the core module 212 in an appropriate format. The data retrieval from the media center 350 may includes EPG metadata or other metadata.

Another example implementation of the media center 350 includes a standalone media device that uses connection scenario 2, with a first connection between the media center 350 and the CM system 335 (e.g., using UPnP) and with a second connection between the CM system 335 and another data source for external content 360b (e.g., using HTTP protocol). In this example, the first connection to the media center 350 may, for example, use the UPnP protocol for device discovery and the HTTP protocol for the command interface and data retrieval (of scheduling data), while the second connection to the external data source may, for example, obtain EPG and/or other metadata using the HTTP protocol for data retrieval. To enable such communications, one of the other gateway modules 218 of the CM system may contain both UPnP and HTTP interfaces 220, or the CM system may instead use two gateway modules that each support one of the UPnP and HTTP communication protocols, with the one or more gateway modules acting in a manner previously described. In addition, a URL or other network address information for an external source of EGP and/or other information may be obtained by the CM system in various, such as based on a predefined configuration for the CM system and/or dynamically from the media center 350.

In the above examples, the external content 360b has been described as optionally including EPG metadata and/or other multimedia content metadata. In other embodiments, the external content 360b may also include various other types of content, such as promotional types of materials for users (e.g., a trailer for a movie, extra content such as deleted scenes, etc.). For example, the GUI 240 may provide capabilities to allow the user to request some promotional materials and/or the ability to select additional services (e.g., providing additional content), such as for a fee.

Figure 3:
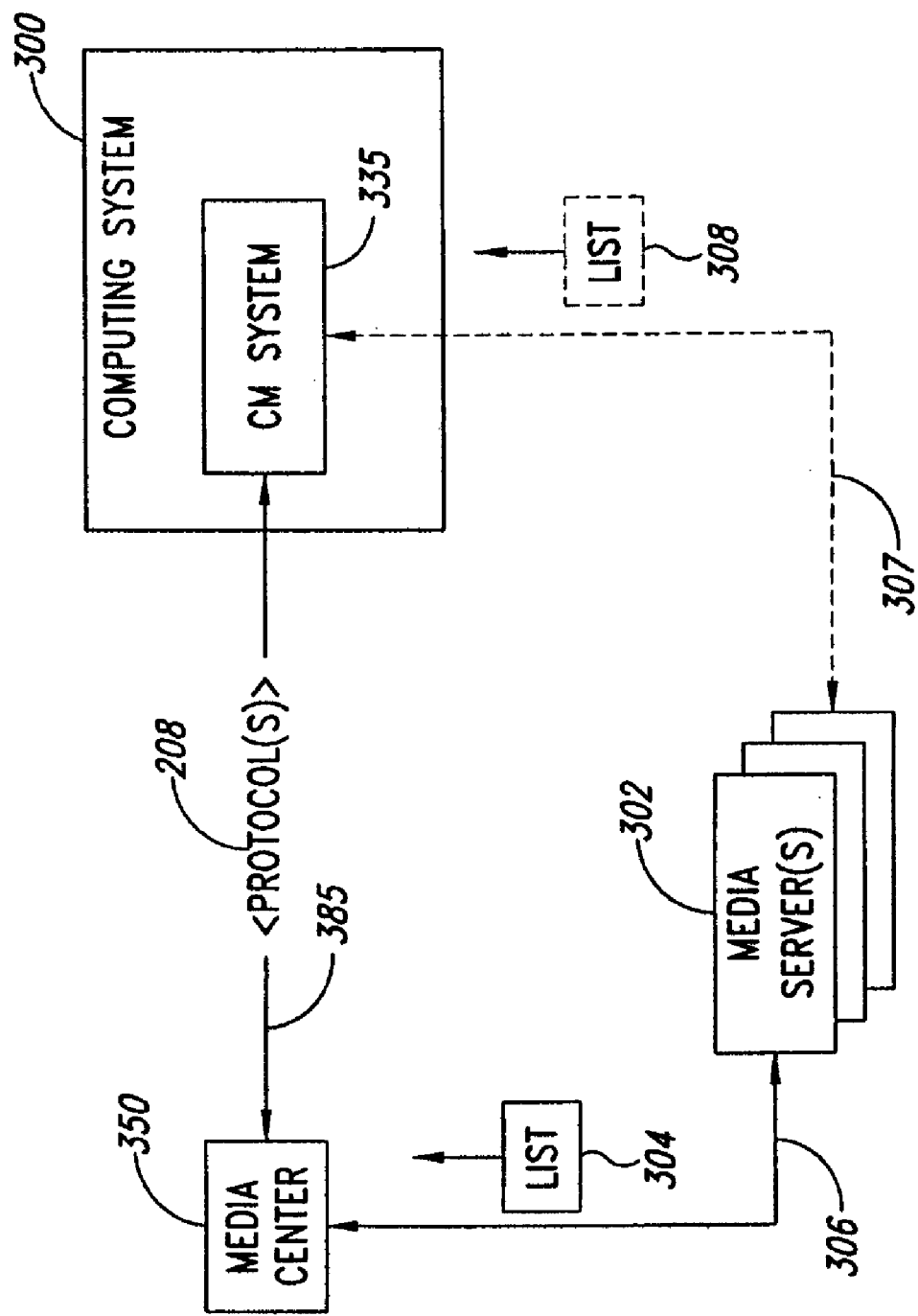
FIG. 3 is a block diagram illustrating an embodiment of the CM system operating in conjunction with one of the other devices and a media server.

FIG. 3 is a block diagram illustrating an embodiment of the CM system 335 operating in conjunction with the media center 350 (and/or other media device) and one or more other media servers 302. In this embodiment, the CM system 335 may instruct the media center 350 to search for or otherwise obtain media content of interest from one or more of the media servers, such as by providing indications of the content of interest and/or of one or more of the media servers. In response, the media center 350 may contact one or more suitable media servers 302 (e.g., media servers indicated by the CM system), obtain indications of pieces of media content available from the media server(s) (e.g., a playlist or other multimedia content listing 304), and provide indications of at least some of the content (e.g., the playlist or other content listing 304) to the CM system 335, such as for display in the GUI 210. For example, if the CM system requested information about specified pieces of media or types of media content, the media center may in some embodiments provide only indications of matching pieces of media (if any), while in the other embodiments may provide all of the identified media piece indications for analysis by the CM system. In addition, if a media server does not provide a playlist or other multimedia content listing, the media center may in some embodiments generate such a content listing after obtaining the indications of the available media pieces from the media server, and/or the CM system may create one or more such playlists (e.g., if the information received from the media center does not include those playlists). A content listing may include various metadata associated with the pieces of media content, such as title, author, creation date, file size, media type, format, resolution, and/or other characteristics.

After the CM system receives indications of available media from the media center, the CM system may specify to the media center to play or otherwise present one or more of the media pieces, such as based on selections made by a user based on a playlist or other information presented in the GUI, with the media center performing the indicated operation (e.g., by presenting a piece of media content on an associated presentation device, not shown, such as after obtaining the media piece from an appropriate media server, or instead by directing an appropriate media server to cause the media piece to be presented, whether itself or via an associated presentation device). In addition, the media center may in some embodiments retrieve and store pieces of media content from one or more such media servers, such as after receiving an instruction to present those media content pieces or instead when initially gathering information about media content pieces that are available from media servers.

In the example embodiment of FIG. 3, the media server device(s) 302 may comprise any type of suitable data repository that may store media content of possible interest (e.g., photographs, audio files (such as MP3 files), video clips, movies, songs, Internet Web page content, graphics and text, video games, advertisements, or other types of multimedia content), including devices such as one or more hard disk drives of a computer, servers, databases, mass storage units, tape decks, CDs, DVDs, floppy disks, and/or other type of persistent or non-persistent storage unit. In some embodiments, the media server(s) 302 may be located in the same household or premises as the other components of the home environment 395, while in other embodiments the media server(s) 302 may be located remotely from the home environment 395 and be accessible via a network such as the Internet, whether instead of or in addition to one or more local media servers. The media server(s) 302 may be accessible by the media center 350 by way of a network 306, such as an internal network (e.g., an Ethernet or LAN connection) and/or an external network (e.g., the Internet), and may further comprise wireless and/or wired/cabled connections. The media server(s) 302 may communicate with the media server(s) 302 using one or more suitable communication protocols, such as the communication protocols described herein or other protocols or combinations thereof.

In some embodiments, the media server(s) 302 may further be communicatively coupled or otherwise accessible to the computing system 300, whether instead of or in addition to a connection 306 to the media center. In such embodiments, the CM system 335 may thus communicate directly with the media server(s) 302 without the media center 350, such as via a network 307 between the CM system 335 and the media server(s) 302 that uses one or more suitable protocols. As with the network 306, the network 307 may comprise an internal network (e.g., an Ethernet or LAN connection) or an external network (e.g., the Internet), and may further comprise wireless and/or hardwire connections.

In at least some embodiments, a user may use the GUI 210 to instruct the CM system 335 to search a particular media server 302 and/or to search for a particular piece of media content. For example, a search field in the GUI 210 may allow a user to create a customized search for music having a specific genre. The core module 212 of the CM system 335 then passes this search request to an appropriate gateway module 218, which transmits the request to the media center 350 using the local network 385 and a suitable protocol 208.

The media center 350 then performs a search of media server(s) based on the criteria provided by the user. Various techniques may be used by the media center 350 to perform a search. In one example implementation, the media center 350 may poll each media server 302 via the network 306 to determine whether each media server 302 contains pieces of media or other content that match the search criteria. In such an implementation, each media server 302 may return a playlist 304 that lists pieces of media that fit the search criteria. The playlist 304 is then provided by the media center 350 to the CM system 335.

In another example implementation, the media server(s) 302 may return a playlist 304 or other content listing that contains indications of all of their available stored media. Thereafter, the media center 350 may parse or otherwise process the playlist 304 to obtain a resulting list of only media that fit the search criteria. The resulting list is then provided by the media center 350 to the CM system 335. In yet another embodiment, the media center 350 may provide the playlist 304 of all available stored media to the CM system 335, and the CM system 335 may process the playlist 304 so that only the pieces of media that fit the search criteria are displayed on the GUI 210. The contents of the playlist 304, whether listing all of the pieces of media in the media server(s) 302 or a subset thereof, may be presented on the GUI 210 and/or on a display coupled to the media center 350 (such as on a screen of the television 370 or on a display of the media center 350). In another embodiment, the CM system 335 may communicate directly with the media server(s) 302 via the network 307 to obtain a playlist 308 of available media at the media server(s) 302. The playlist 308 may comprise a list of all available media or a list of available media having certain criteria, such as user-defined criteria. The contents of the playlist 308 may then be displayed by the core module 212 on the GUI 210 of the CM system 210.

Thereafter, the user may operate the GUI 210 to select a piece of media content from the playlist 304 or 308 so as to cause the selected piece of media content to be played back or otherwise presented. For example, if the user selects a particular song for playback from the playlist 304 or 308 using the GUI 201 (including perhaps specifying a particular content presentation device 380 to play back the song), the CM system 335 communicates this request to the media center 350. The media center 350 receives this request from the CM system 335 via the network 385, obtains a copy of the requested song from the appropriate media server 302, and sends the copy of the song to the specified content presentation device 380 for playback. Alternatively, the media center 350 may request the media server 302 to provide the copy of the song directly to the specified content presentation device 380 for playback.

In addition, in at least some embodiments the CM system 335 may be remotely accessed by a user, such as via the Internet or other network. This remote access capability allows the user to use the CM system 335 to remotely control content presentation control devices accessible to the CM system (e.g., to program the media center 350 to record a program, to view and manipulate EPG or other metadata, to turn a home appliance ON or OFF, to activate or deactivate parental control settings, and various other functions that may be performed by using the CM system 335 to control the media center 350, content presentation devices 380, and/or other computing devices 390), without necessarily being present in the household environment 395 and physically using the computing device 300 that provides the CM system 335. Accordingly, FIG. 4 is a block diagram illustrating an embodiment of the CM system 335 that may be remotely accessed via a network.

Figure 4:
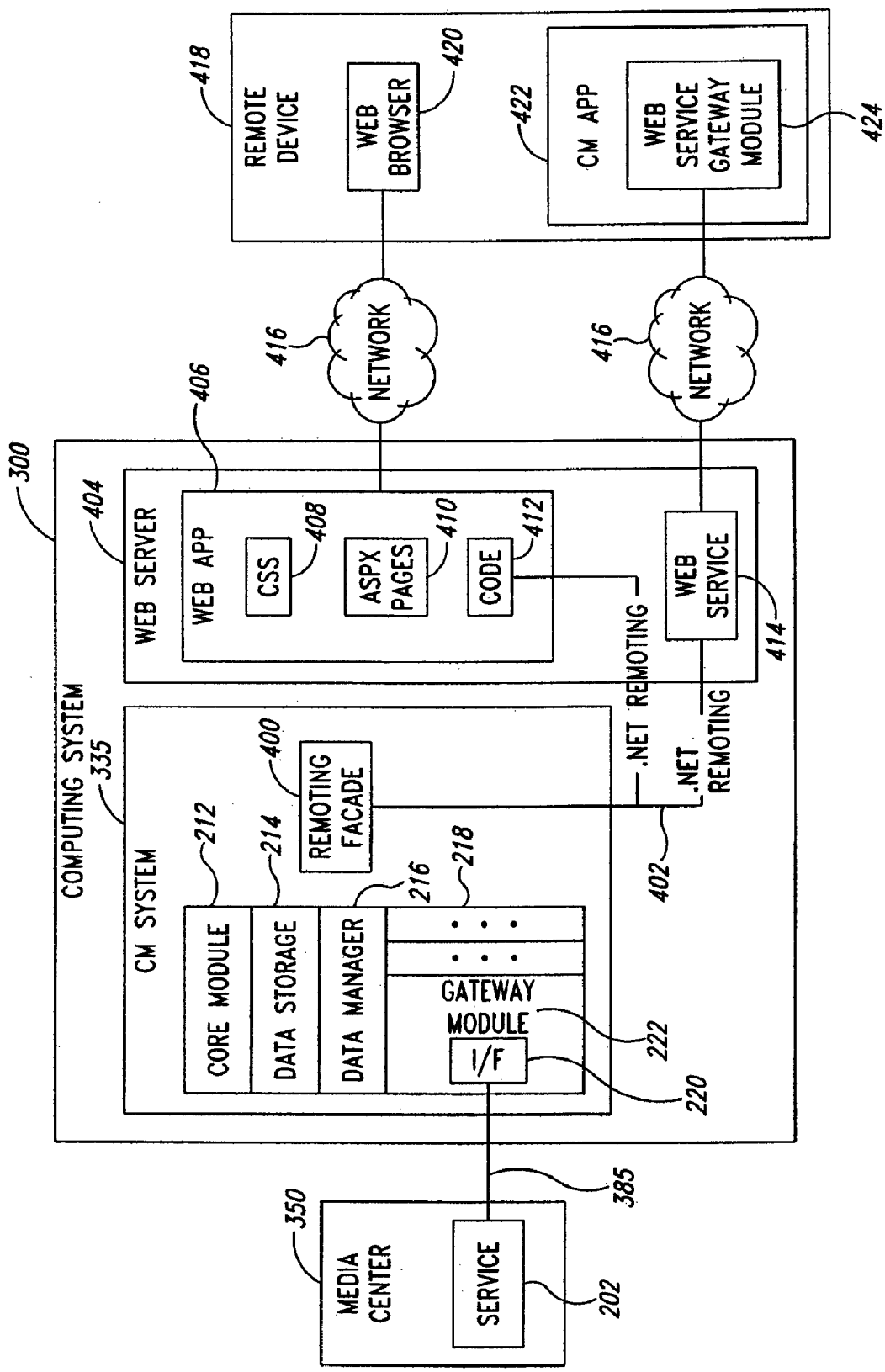
FIG. 4 is a block diagram illustrating an embodiment of the CM system that can be remotely accessed via a network.

The illustrated embodiment of the CM system 335 in FIG. 4 includes a remoting façade 400 or other suitable component or layer to support two-way communication. While the remoting façade 400 may in some embodiments merely provide access to other elements 212-222 of the CM system such as were described with respect to FIG. 3, in the illustrated embodiment the remoting façade provides a higher-level interface to those CM system elements that is better suited for communications 402 with other elements of the computing device 300. In some embodiments, the communications 402 are performed using Microsoft's .Net remoting, with the remoting façade 400 being a .Net object that is exposed to other processes and/or components using the .Net remoting communications 402, while in other embodiments a variety of other types of remote procedure call ("RPC") or similar intercommunication mechanisms may instead be used. In addition, the illustrated embodiment of the computing device 300 includes a Web server 404, which may be separate from or part of the CM system 335. The Web server 404 includes a Web service 414 that exposes the remoting façade 400 to a network 416 (e.g., a wireless and/or wired/cabled hardwire network, such as the Internet, a WAN, a LAN, a telecommunications company network, and/or other type of network).

The illustrated Web server 404 further includes a Web application 406, which in at least some embodiments comprises an Active Server Page ("ASP") ASP.Net Web application that provides a Web GUI front-end for the CM system 335. The Web GUI may be provided alternatively or additionally to the GUI 210 of FIG. 3, such as to provide remote users on the network 416 with capability to access and use the CM system 335 via the Web GUI while local users access and use the CM system 335 via GUI 210. The Web application 406 in the illustrated embodiment includes Cascade Style Sheets (CSS) 408 that may be used to provide flexibility and ease in generating and changing the look-and-feel of the Web GUI, ASPX pages 410 to support its operation, and code 412 to provide communication between the Web application 406 and the remoting façade 400 of the CM system 335 via .Net remoting communication 402. In other embodiments, a separate Web GUI may instead not be provided, such as if remote users receive the same GUI 210 as would local users. In addition, in some embodiments the Web GUI may be tailored or customized to support various types of devices (e.g., by varying formatting and/or amount of data provided), such as devices with limited display area, connection speed and/or processing power (e.g., cellphones and other handheld or mobile devices, such as smartphones).

The Web GUI and associated functionality provided by the Web application 406 and the Web service 414 are provided by the network 416 to one or more remote devices 418 in the illustrated embodiment. A suitable communication protocol may be used on the network 416 to allow communication between these elements and the remote device(s) 418, including (without limitation) HTTP, HTTPS, SOAP, and/or other communication protocols. Examples of a remote device 418 may include various types of mobile devices (e.g., a laptop, PDA, cellular telephone, Blackberry, GPS device, or other mobile wireless device) as well as stationary computing devices (e.g., a personal computer (PC), workstation, and so forth).

The illustrated embodiment of the remote device 418 includes a Web browser 420 or other type of browser or application that is suitable to communicate with the Web server 404 and/or render the Web GUI provided by the Web application 406. For instance, the user may use the Web browser 420 to access an interactive Web page and/or Web site where the Web GUI is provided and accessible to allow the user to enter (or view) commands and data, or instead may use a CM application 422 to communicate with a Web service 414 provided by the Web server 404 using a suitable protocol (e.g., HTTP and SOAP). While the illustrated embodiment of the remote device includes both a Web browser 420 and a CM application 422 (which in the illustrated embodiment includes a Web service gateway module 424, such as a plug-in module for the CM application), in other embodiments a remote device may include only one such access mechanism. In this example embodiment, the user may generate control requests and data requests using the Web GUI rendered by the Web browser 420, with such requests then communicated by the Web service gateway module 424 to the Web service 414, which in turn communicates the requests to the remoting façade 400 so that the appropriate operations may be performed by the elements 212-222 of the CM system 335 to fulfill the requests. In addition, while not illustrated here, in other embodiments the Web browser 420 may execute a Web page from Web application 406 containing an embedded application (e.g., using ActiveX, s Java applet, client-side JavaScript, etc.) that provides at least a portion of the CM system functionality and that can interact with Web service 414.

While various embodiments of the CM system 335 have been described in the context of controlling media devices (such as the media center 350) in connection with media presentation, in at least some embodiments use of the CM system 335 may be extended to operations and/or devices that are alternative or additional to media devices. One example of such additional use of the CM system 335 is in connection with home automation or a "smart home." For example, in a "smart home" embodiment illustrated with respect to FIG. 5, a home environment 395 includes one or more other electromechanical devices that are coupled or otherwise accessible to the CM system 335 and that may be controlled by the CM system. In particular, a plurality of electromechanical devices 500 of various types are present in the home environment in the illustrated embodiment, with examples of the electromechanical (E/M) devices including lighting systems, HVAC systems, security systems, automated drapes, automated wall panels that may be raised/lowered or retracted/extended, telephones, appliances, and various other E/M devices.

Some E/M devices 500 may have their own associated processor(s) and/or communication capability (e.g., "intelligent" E/M devices), and may be networked to the media center 350, to the other computing systems 390, and/or to the CM system 335 via respective communication networks 504, 502, and 506. The communication networks 504, 502, and 506 may comprise networks similar to the networks 385 and 385a described previously above and may carry communications based on one or more suitable protocols (e.g., UPnP, HAVI, HTTP, etc.). With intelligent E/M devices 500, the CM system 335 may directly communicate control requests and data requests directly to such devices via the network 506, without necessarily having to communicate through some other intelligent device in order to initiate an action.

With less intelligent E/M devices 500, an intermediate controlling device is used as an interface between the CM system 335 and such E/M device(s). For example, automated drapes may not have their own associated processor and/or communication interface. Rather, these automated drapes may have an electromechanical actuator that may be controlled by the computing system 390 or by some other intelligent controlling mechanism, such as via a connection provided by the network 502. Therefore, for such less intelligent E/M devices 500, the CM system 335 may communicate with the computing system 390 via the network 385a and the protocol 208a, with the computing system 390 in turn interacting with the appropriate E/M devices via the network 502.

In some embodiments, operation of at least some of the E/M devices 500 may be correlated or otherwise tied to media presentation. For instance, if the user wishes to watch a movie, various other devices may be controlled in a coordinated manner to facilitate that media presentation (e.g., to set a certain room temperature, lighting level, deactivation of a telephone by directing incoming calls to voicemail, etc.). Moreover, in some situations a user may further desire to start cooking popcorn or a pizza in the oven. Therefore, the media center 350 (which initiates playback of the movie) under control by the CM system 335 may communicate the playback-related information and/or commands (e.g., date and time at which playback will occur, requests to perform some action, or other commands or information) to the appropriate E/M devices 500 and/or to the computing systems 390, or the CM system 335 may instead directly interact with those E/M devices 500 to effect the desired results. The appropriate E/M devices 500 will then respond as directed, such as to reduce the lighting levels, deactivate the telephone, begin cooking popcorn, and so forth.

Thus in the embodiment described above, context information may be maintained across these multiple types of E/M devices 500, the media center 350, the other computing systems 390, and/or the CM system 335. Maintaining such context insures, for instance, that certain devices are not activated or deactivated when they should not be. For example, by maintaining context (e.g., knowing that the media center 350 is presently controlling presentation of a recorded movie), an inappropriate action is not taken (e.g., opening all the drapes and windows to let excessive amounts of light and noise into the home environment 395).

Figure 5:
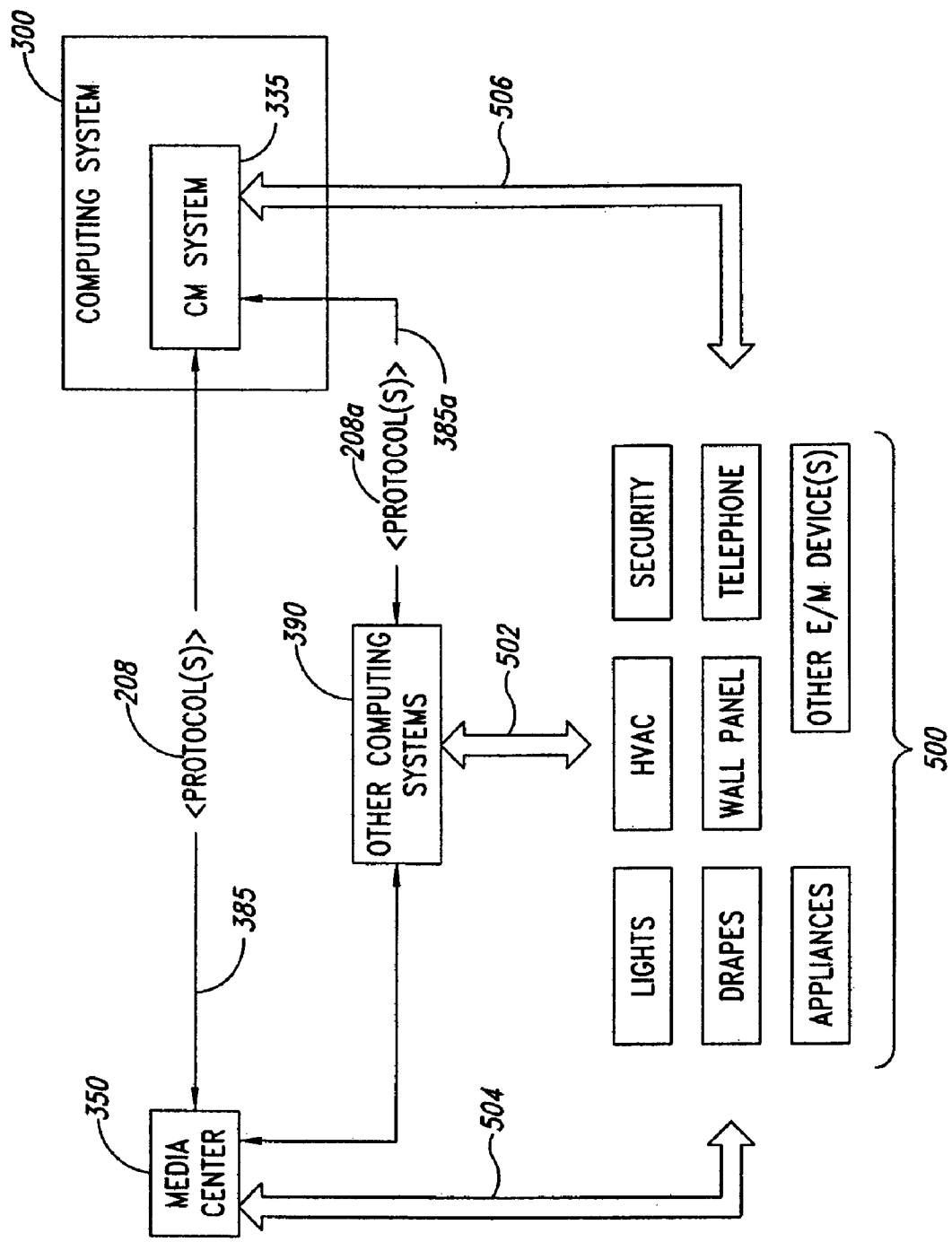
FIG. 5 is a block diagram illustrating use of an embodiment of the CM system to control other types of devices in the CM environment.

Moreover in some embodiments resources may be shared between the various devices of FIG. 5. For example, state information may be shared between the various devices so that they know the state of each other, thus allowing devices to optimize or time their operation based on the status of the other devices. As another example, certain user interfaces, data repositories, communication interfaces, networks, or other elements may be shared by the various devices, so that each device need not necessarily provide their own of these elements. Data re-use and data sharing may be implemented to reduce instance of repetitive data generation, memory accesses, or other redundancy.

Figure 6:
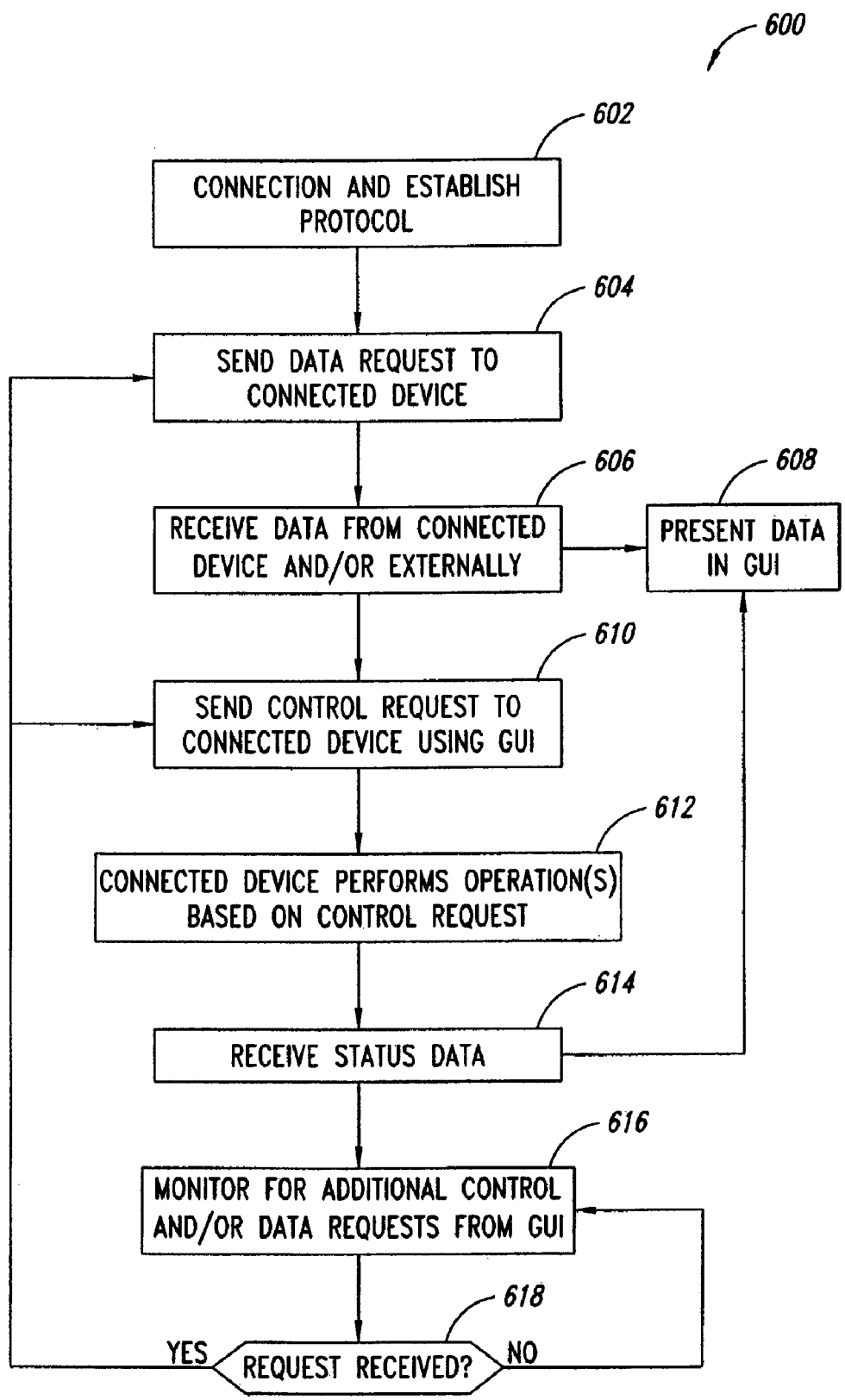
FIG. 6 is a flowchart of an embodiment of a routine for operating an embodiment of the CM system.

FIG. 6 is a flowchart 600 of an embodiment of a routine for operating the CM system 335. The routine begins at step 602, where connection with one or more external devices is established based on one or more communication protocols. For instance, at least some such other devices may be previously known to the CM system (e.g., based on prior interactions), while other devices may be dynamically identified (e.g., via UPnP discovery, description, etc. steps as described previously above).

At step 604, the CM system 335 next sends a data request to a connected device (e.g., based on a connection and protocol established in step 602 for that device), such as to a media device (e.g., the media center 350), other computing system(s) 390 and/or one or more external data sources. The data request may be sent in response to user input via a GUI displayed to a user (not shown) or independently by the CM system 335 (e.g., as part of a startup routine to obtain metadata for use with such a GUI). At step 606, the CM system receives the requested data, which may then be presented on a GUI at step 608 (e.g., for viewing and/or manipulation by the user).

In the illustrated embodiment, the routine next continues to step 610 to send a control request to a connected device (e.g., based on a user selection via the GUI after the user has seen the requested data), although in other embodiments the routine may continue instead to step 616. For instance, the user may have reviewed a returned listing of recorded media and issued a control request for a selected one of the listed pieces of media to be played back. The connected device then initiates performance of the requested operation(s) based on the control request, such as is illustrated here at step 612 for the sake of convenience, which may include interactions with one or more other presentation devices. For instance, if the control request is a request to play back a piece of recorded media, the media center 350 may provide the recorded media to the television 370 for presentation thereon. Alternatively or additionally, the connected device may perform the requested operation directly. For instance, if the connected device is an intelligent HVAC system and the control request is a request to reduce room temperature, the HVAC system may directly change a thermostat.

At a step 614, the CM system 335 optionally receives status data or other feedback from the connected device based on its performance of the control request, with the status data then presented to the user in the GUI at step 608. For instance, the status data may indicate that a television program is being recorded, playback is completed, insufficient memory space is available, the connected device has been turned ON or OFF, and so forth. At step 616, the CM system 335 then monitors for additional or subsequent control and/or data requests, such as from the GUI and/or from remote users via programmatic requests (e.g., via Web service 414). The CM system continues to monitor for these requests until a request is detected at step 618, with the routine then returning to steps 604 or 610 respectively to perform corresponding data or control requests.

In some embodiments, the functionality provided by the routine discussed above may be provided in alternative ways, such as being split among more routines. Similarly, in some embodiments the illustrated routine may provide more or less functionality than is described, such as when the amount of functionality that is provided is altered. In addition, while various operations may be illustrated as being performed in a particular manner (e.g., in serial or in parallel) and/or in a particular order, in other embodiments, the operations may be performed in other orders and in other manners. In addition, in some embodiments certain operations may be embodied in software or other computer-readable instructions stored on a computer-readable medium, such as software stored in the memory 330 of the CM system 335 of FIG. 1.

Figure 7:
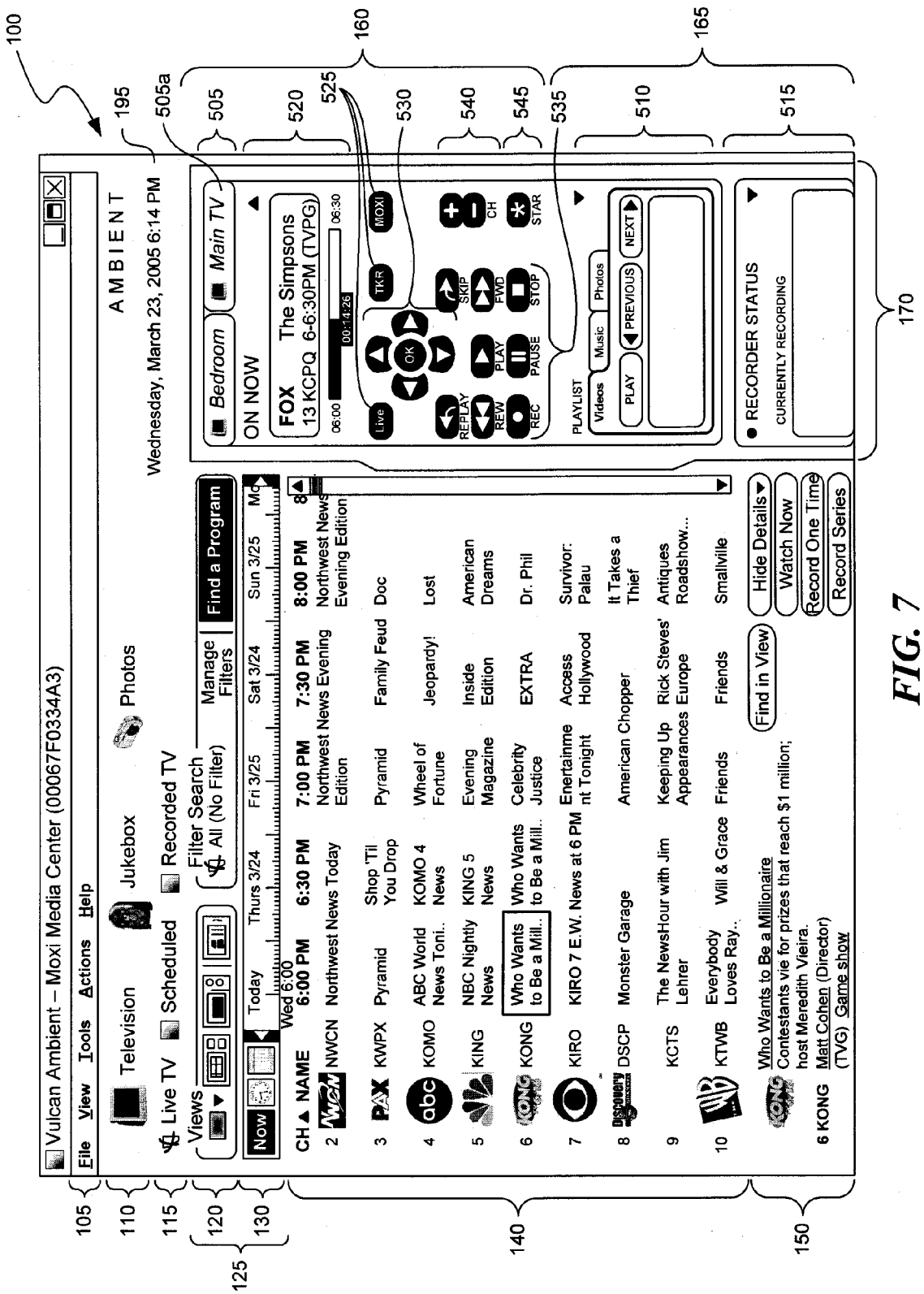
FIG. 7 illustrates an example embodiment of a GUI for a content management system.

FIG. 7 illustrates an example of information and capabilities provided by an embodiment of the CM system, and in particular illustrates various features of an example GUI, including a variety of information and user-selectable controls. While specific layouts and formats are shown in FIG. 7, such specific details are not intended to be limiting or exhaustive. Similarly, while specify types of devices are illustrated as being currently controlled or otherwise managed via the GUI, a variety of other types of content presentation control devices and other media devices, as well as other electronic devices, may similarly be associated with and managed via the GUI in other embodiments.

The example GUI 100 embodiment illustrated in FIG. 7 is displaying program listing information for live TV in a view area 140, with the displayed listings initially based on a current time 195. The TV listings in the view area 140 are initially shown in a grid format, with columns of the grid corresponding to successive time units of thirty minutes each and with each row corresponding to a different TV channel that may show one or more TV programs during the displayed time period. The GUI also includes a variety of other areas, including a menu bar 105 with dropdown menus, primary content-type navigation tabs 110, secondary content-type-specific navigation tabs 115, a view control area 125 that includes view and filter controls 120 and time controls 130, a detail area 150, and a status control sidebar area 170 that includes virtual remote control functionality 160 and a user-focused content summary area 165. While not illustrated here, in some embodiments the GUI may further have a status bar display area along the bottom of the GUI below the detail area and status control sidebar area.

The view control area 125 also includes a first timebar that corresponds to a relatively long first time period at a first time scale (which is selected based in part using time controls 130) and that may in certain situations display limited information about content (although in this example the first timebar does not display any limited information about any television programs or other content), while the view area 140 illustrates detailed information about content for a relatively short second time period at a second time scale, with a second timebar rendered at the top of the view area 140.

The example GUI 100 also illustrates a variety of controls and information 505-545 in the status control sidebar area 170, such as to provide virtual remote control capabilities in order to control recording of content on multiple devices (e.g., multiple devices with DVR capabilities) and/or presentation of content on multiple devices (e.g., multiple televisions). For example, the illustrated sidebar area contains multiple user-selectable device control tabs 505, with each tab representing a device that can be controlled, such as with respect to presenting content and/or recording or otherwise obtaining content for later presentation. In this example, two television devices are available to which live or previously recorded content can be directed, with the "Main TV" device currently selected as indicated by tab 505a. The current content information section 520 indicates that "The Simpsons" television programming is currently being directed to the "Main TV" television device for presentation, while other content (not shown) may be being directed to the "Bedroom"

television device. In some embodiments, controls may be sent directly to the device being controlled (e.g., by directing the "Main TV" television device to change channels), while in other embodiments one or more intermediate devices may be involved in the controls (e.g., by directing an STB, not shown, to control live television content sent to the currently selected television device and/or by directing a DVR, not shown, to direct recorded television content sent to the currently selected television device). Moreover, in some embodiments one or more such intermediate devices may each be able to interact with and/or control multiple presentation devices, such as to have a single STB and/or DVR control content being provided to two television devices (e.g., by using a MOXI device that provides such functionality).

Content to be directed to a currently selected device may be selected in various ways. For example, user-selectable channel controls 540 are shown for manipulating a current channel, and in other embodiments other controls (e.g., user-selectable numeric buttons, not shown) may be available for specifying a particular channel. In addition, in the current embodiment various program listing information for live TV is shown in a separate view area in grid format, and additional information is displayed in the detail area for a "Who Wants to Be a Millionaire" television program that is currently selected in the view area—in this embodiment, a user-selectable "Watch Now" control in the detail area may be selected to cause the currently selected program to be directed to the currently selected television device, and similar functionality may be available for some or all of the television programs indicated in the view area (e.g., via a pop-up menu). The illustrated embodiment of the sidebar also includes a user-focused content summary area 515 related to upcoming recordings and previously recorded programs, and while a display of previously recorded programs in section 515 is not illustrated here, a displayed previously recorded program may be selected for current presentation on the currently selected television device (e.g., via instructions sent to a DVR or other storage device on which that program is stored).

A playlist section 510 is also shown in the illustrated embodiment, although no content is displayed in this example for a current playlist. In at least some embodiments, content of various types may be selected for inclusion in one or more such playlists, and content displayed in a playlist in section 510 may similarly be selected for current presentation on the currently selected television device (e.g., via instructions sent to a DVR or other storage device on which that program is stored). In the illustrated embodiment, content in playlists may include various forms of content, such as video information (e.g., television programming), digital music, photos and other images, etc. In some embodiments, the device that is currently selected for control may affect the information in the playlist section in various ways, such as to select a current playlist based on a current device being controlled (e.g., based on the type of device, such as to select a playlist having video information when the device being controlled is a television device) and/or to enable content for current selection only if appropriate for the currently selected device (e.g., to disable video or image information if the currently selected device is a speaker, but to allow video, images and music to be presented on at least some types of television devices, such as based on capabilities of the device).

The illustrated embodiment of the sidebar control area also includes a variety of other controls related to content being presented and to other types of user instructions that may be provided. For example, various user-selectable controls may affect the type of content being presented from among various sources, such as live television programming (e.g., from a cable company or satellite provider), a menu or other functionality from a DVR (e.g., a MOXI device), and a ticker on at least a portion of the display of the currently selected television device (e.g., with headline news, such as from a cable company or from a provider associated with the DVR). Various interactivity controls 530 may further allow the user to make various selections, such as from a menu or from among multiple options. Various controls 535 may also be used to control the presentation of content, such as to pause presentation, skip backward, skip forward (when available, such as with other than live content) and rewind or fast forward, as well as to provide an instruction to record content that is currently being presented. One or more specialized controls 545 may also be provided, such as to correspond to functionality that may be available on only certain devices, such as on certain types of STBs and/or DVRs.

While various exemplary details have been provided, the described techniques may be used in a variety of other ways. In addition, the described techniques are applicable to architectures other than a set-top box architecture or architectures based upon the MOXI™ system, for instance. For example, an equivalent system and applications may be developed for other DVRs and STBs. The methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.), and other devices are able to be controlled or to control other devices in the manner described herein. In addition, data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

Several specific protocols have been identified and described herein for providing communication capabilities between different devices. Various other mechanisms may be used to allow computers (or other devices) and executing software applications to interact. For example, remote procedure call ("RPC") protocols allow a program on one computer to cause a program on another computer to be executed, and various object-oriented and other architectures such as CORBA ("Common Object Request Broker Architecture"), DCOM ("Distributed Component Object Model"), Java RMI ("Remote Method Invocation"), JavaSpaces, Jini, and JXTA provide similar capabilities. In addition, a variety of middleware programs may be implemented to connect separate applications (often of distinct types and from unrelated sources) to allow communication. For example, various EDI ("Electronic Data Interchange") networks may be used to provide mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs, such as via Web services. Web services, such as those described herein, allow heterogeneous applications and computers to interact, and may be defined and implemented using a variety of underlying protocols and techniques. For example, some Web service implementations return data in computer-readable XML format using HTTP in response to a Web service invocation request specified as a URI ("Uniform Resource Identifier"), such as a URL that includes a specified operation and one or more query parameters. In other implementations, additional underlying protocols are used for various purposes, such as SOAP for standard message exchange, WSDL ("Web Services Description Language") for description of service invocation interfaces (e.g., using XML format), and UDDI ("Universal Description, Discovery, and Integration service") for discovery of available services. These are but a few examples that may be used in various embodiments.

In the description, numerous specific details have been given to provide a thorough understanding of embodiments. The embodiments may be practiced without one or more of the specific details, or with other methods, components, materials, etc. In other instances, well-known structures, materials, or operations are not shown or described in detail to avoid obscuring aspects of the embodiments. Thus, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for enabling a computing device to be remotely accessed to control media device and a heating, ventilation, and air conditioning system, the method comprising:
    configuring the computing device as a central control point, the computing device capable to generate control requests and data requests related to operation of the media device and the heating, ventilation, and air conditioning system using a core module of a management system of the computing device;
    separating the core module of the management system from a remote graphical user interface of the management system, by using a Web application of a Web server to generate the remote graphical user interface and to make the remote graphical user interface available to a browser of a remote device via a network to allow the browser to render the remote graphical user interface to provide access and use of the management system to a remote user;
    providing a Web service of the Web server to allow the remote device to communicate with the core module;
    providing a remoting layer to allow the Web application and the Web service to communicate with the core module;
    providing a local graphical user interface for simultaneous access and use of the management system by a local user;
    suppressing on-screen display of messages on at least one of the media device or the heating, ventilation, and air conditioning system that is accessed by the remote user;
    receiving a message from at least one of the media device or the heating, ventilation, and air conditioning system accessed by the remote user; and
    displaying the message via the remote graphical user interface in lieu of the suppressed on-screen display of the messages.

2. The method of claim 1 wherein the graphical user interface is usable by the remote device to instruct the core module to generate the control requests and the data requests.

3. The method of claim 1 wherein the method further comprises:
    facilitating communication between the core module and the media device and the heating, ventilation, and air conditioning system via one or more gateway modules, wherein each of the one or more gateway modules is associated with the media device or the heating, ventilation, and air conditioning system.

4. The method of claim 1 wherein the method further comprises:
    receiving via the Web service a user command entered via the graphical user interface; and
    transmitting via the remoting layer the user command to the core module.

5. The method of claim 1 wherein the Web application displays via the graphical user interface information generated by the core module in association with at least one of the control requests or data requests.

6. A non-transitory computer-readable medium having stored thereon instructions for enabling a computing device that can control media device and a heating, ventilation, and air conditioning system to be remotely accessed, by:
    using a computing device as a central control point to provide control requests and data requests related to operation of the media device and the heating, ventilation, and air conditioning system, the computing device including a management system having a core module to generate the control requests and data requests to the media device and the heating, ventilation, and air conditioning system;
    separating the core module of the management system from a remote graphical user interface that can be used to interact with the management system,
        wherein the remote graphical user interface is provided by Web application and is made available by the Web application to a remote device via a network,
        and wherein a remoting layer being is used to allow the core module and the Web application to communicate with each other,
        and wherein a Web service being is used to allow the remote device to communicate with the core module through the remoting layer,
        and further wherein the Web application and the Web service comprise parts of a Web server, and the web server and the management system comprise parts of the computing device;
    in response to remote user input at the remote device that is entered using the remote graphical user interface as presented on the remote device and that is communicated by the remote device to the Web service, providing a remote user access to the management system by providing the remote user input to the core module via the remoting layer and generating a control request or a data request corresponding to the received remote user input;
    providing a local graphical user interface for simultaneous access of the management system by a local user;

suppressing on-screen display of messages on at least one of the media device or the heating, ventilation, and air conditioning system that is accessed by the remote user;

receiving a message from at least one of the media device or the heating, ventilation, and air conditioning system acessed by the remote user; and displaying the message via the remote graphical user interface in lieu of the suppressed on-screen display of the messages.

7. The non-transitory computer-readable medium of claim 6 wherein the non-transitory computer-readable medium is a memory of the computing device.

8. The non-transitory computer-readable medium of claim 6 wherein the method further comprises:

receiving a response to a control request or a data request from at least one of the media device or the heating, ventilation, and air conditioning system through a gateway module of the management system;

sending the response from the gateway module to the core module; and communicating the response from the core module to the Web application, via the remoting layer, to allow the response to be presented on the graphical user interface accessible by the remote device.

9. The non-transitory computer-readable medium of claim 6 wherein the management system further includes a storage unit to store data related to the control requests and data requests, and a data manager to manage communication of data between the core module and the storage unit.

10. A computing system configured to control a plurality of networked devices in an environment, the computing system comprising:

one or more processors and one or more memories; and a management system that when executed by the one or more processors communicatively couples to:

at least one media device via a first network connection that uses a first communication protocol, wherein the media device is communicatively coupled to at least one content presentation device, to a lighting system, and to at least one automated wall panel;

at least one computing system via a second network connection that uses a second communication protocol, wherein the computing system is coupled to a heating ventilation and air conditioning system to allow the computing system to control operation of the heating, ventilation, and air conditioning system; and at least one drapes device via a third network connection that uses a third communication protocol, wherein the lighting system, the at least one automated wall panel, the heating, ventilation, and air conditioning system, and the at least one drapes device share state information including device status with each other, and wherein the lighting system, the at least one automated wall panel, the heating, ventilation, and air conditioning system, and the at least one drapes device modify their operation based at least in part on the shared state information, the management system including:

a core module to generate control requests and data requests related to operation of the at least one media device, the computing system, and the at least one drapes device;

multiple gateway modules that each correspond to a different type of networked device, wherein the multiple gateway modules include first, second, and third gateway modules corresponding respectively to the at least one media device, the computing system, and the at least one drapes device, and wherein the gateway modules are in communication with the core module to receive the control requests and data requests from the core module, and are further in communication with the core module to provide responses to the control requests and the data requests to the core module; and first, second, and third communication interfaces respectively included with the gateway modules to provide the control requests and the data requests generated by the core module to the at least one media device, the computing system, and the at least one drapes device via the respective first, second, and third network connections using the respective first, second, and third communication protocols, and to provide responses to the control requests and the data requests to the core module, wherein each of the communication interfaces is associated with the corresponding type of networked device, wherein the core module and the multiple gateway modules are implemented as computer-executable instructions stored in the one or more memories and executed by the one or more processors.

11. The system of claim 10 wherein the management system further includes a graphical user interface that can be used to instruct the core module to generate the control requests and the data requests, and that can further be used to receive from the core module and to present at least some of the responses to the control requests and data requests received from the at least one media device, the computing system, and the at least one drapes device.

12. The system of claim 10 wherein a control request related to operation of the heating ventilation and air conditioning system; as provided by the management system to the computing system via the second network connection using the second communication protocol or a control request related to operation of the at least one drapes device as provided by the management system to the at least one drapes device via the third network connection using the third communication protocol, is based on context information associated with a control request that is provided by the management system to the at least one media device via the first network connection using the first communication protocol and that is related to operation of the at least one content presentation device, and wherein the context information is communicated between the at least one media device and the lighting system or the at least one automated wall panel, or between the at least one media device and the computing system, the context information being usable by the management system to determine which control requests related to operation of the lighting system, the at least one automated wall panel, the heating, ventilation, and air conditioning system, and the at least one drapes device should be generated to complement operation of the at least one content presentation device.

13. The system of claim 10 wherein the lighting system, the at least one automated wall panel, the heating, ventilation, and air conditioning system, and the at least one drapes device modify their operation by optimizing their operation based at least in part on the device status of at least one of the lighting system, the at least one automated wall panel, the heating, ventilation, and air conditioning system, and the at least one drapes device.

14. The system of claim 10 wherein the lighting system, the at least one automated wall panel, the heating, ventilation, and air conditioning system, and the at least one drapes device modify their operation by timing their operation based at least in part on the device status of at least one of the lighting system, the at least one automated wall panel, the heating, ventilation, and air conditioning system, and the at least one drapes device.

15. The system of claim 10 wherein state information is maintained on the at least one automated wall panel, the heating, ventilation, and air conditioning system, and the at least one drapes device, and wherein the management system does not store the shared state information.

16. The system of claim 10 wherein the management system is extensible such that an additional gateway module that corresponds to an additional networked device may be added to the management system for use with the additional networked device.

* * * * *

UNITED STATES PATENT AND TRADEMARK OFFICE
CERTIFICATE OF CORRECTION

| | | |
|---|---|---|
| PATENT NO. | : 8,359,351 B2 | Page 1 of 1 |
| APPLICATION NO. | : 12/873871 | |
| DATED | : January 22, 2013 | |
| INVENTOR(S) | : Anthony F. Istvan et al. | |

It is certified that error appears in the above-identified patent and that said Letters Patent is hereby corrected as shown below:

Title page 2, under "Other Publications", in column 1, line 10, delete "http;//" and insert -- http:// --, therefor.

Title page 2, under "Other Publications", in column 1, line 21, delete "technolgy:" and insert -- technology: --, therefor.

Title page 2, under "Other Publications", in column 2, line 17, delete "controling" and insert -- controlling --, therefor.

Title page 2, under "Other Publications", in column 2, line 53, delete "Readen" and insert -- Rearden --, therefor.

Title page 3, under "Other Publications", in column 2, line 7, delete "Pritable" and insert -- Printable --, therefor.

In column 5, line 55, delete "system." and insert -- system). --, therefor.

In column 23, line 39, in claim 1, delete "control media" and insert -- control a media --, therefor.

In column 24, line 31, in claim 6, delete "control media" and insert -- control a media --, therefor.

In column 24, line 48, in claim 6, after "layer" delete "being".

In column 24, line 51, in claim 6, after "service" delete "being".

In column 25, line 6, in claim 6, delete "acessed" and insert -- accessed --, therefor.

Signed and Sealed this
Second Day of April, 2013

Teresa Stanek Rea
*Acting Director of the United States Patent and Trademark Office*